United States Patent [19]
Morris et al.

[11] Patent Number: 6,075,650
[45] Date of Patent: Jun. 13, 2000

[54] BEAM SHAPING OPTICS FOR DIVERGING ILLUMINATION, SUCH AS PRODUCED BY LASER DIODES

[75] Inventors: G. Michael Morris, Fairport; Kevin J. McIntyre, Rochester; Kenneth F. Walsh, Lima, all of N.Y.

[73] Assignee: Rochester Photonics Corporation, Rochester, N.Y.

[21] Appl. No.: 09/095,300

[22] Filed: Jun. 10, 1998

Related U.S. Application Data

[63] Continuation-in-part of application No. 09/055,653, Apr. 6, 1998.
[51] Int. Cl.[7] .............................. G02B 9/06; G02B 3/02
[52] U.S. Cl. ...................... 359/641; 359/710; 359/718; 359/719
[58] Field of Search .................................. 359/710, 718, 359/719, 641

[56] References Cited

U.S. PATENT DOCUMENTS

| | | |
|---|---|---|
| 4,623,225 | 11/1986 | Forkner . |
| 4,695,719 | 9/1987 | Wilwerding . |
| 4,846,552 | 7/1989 | Veldkamp et al. . |
| 4,915,484 | 4/1990 | Yamamoto . |
| 4,935,939 | 6/1990 | Liau et al. . |
| 5,148,319 | 9/1992 | Gratix et al. . |
| 5,321,717 | 6/1994 | Adachi et al. . |
| 5,467,335 | 11/1995 | Braat . |
| 5,553,174 | 9/1996 | Snyder . |
| 5,663,980 | 9/1997 | Adachi . |

OTHER PUBLICATIONS

Braat, J., "Design of beam–shaping optics", Applied Optics, pp2665–2670, May 20, 1995, vol. 34, No. 15.

Connely et al., "Diffraction Limited Virtual Point Source Microlenses", SPIE vol. 2383, pp. 252–260,(1995).

Faklis, et al., "Continuous phase diffactive optics using laser pattern generation", SPIE Holography Tech. Group Newsletter, vol. 2, Jul. 1993.

Forkner et al., "Characteristics of efficient laser diode collimators", Proc. SPIE vol. 390, pp 156–164 (1983).

Gale, M.T., Rossi, M., Pederson, J., and Schultz, H., "Fabrication of continuous–relief micro–optical elements by direct laser writing in photoresists," Opt. Eng vol. 33, No. 11, pp 3556–3566 (1994).

Kingslake, R., "Fundamentals of Lens Design," Academic Press, Chpt. 3 (1978), pp. 39–40.

(List continued on next page.)

*Primary Examiner*—Robert H. Kim
*Assistant Examiner*—Andrew H. Lee
*Attorney, Agent, or Firm*—M. LuKacher; K LuKacher

[57] ABSTRACT

A lens shapes a diverging laser diode beam, and particularly circularizes and collimates, or diverges, or converges the beam. The lens may be part of an optical system, or part of a laser diode assembly. The lens is constituted of a body, the opposite ends of which are spaced from each other. The surfaces of the ends may be toric with the toric centers being coincident with the optical axis. The surfaces also have curvature profiles which circularize and collimates, or diverges, or converges collimates the beam. The curvature profile of one of the first and second surfaces has a correction profile which is a function of Zernike polynomials, thereby reducing wavefront error of the beam exiting the lens. The correction profile is also a function of the offset of the laser diode from the optical axis (misalignment), thereby increasing the misalignment tolerances for beam to lens centering. The curvature profiles of the surfaces may have correction for astigmatism in the beam shape produced by the laser diode. The body of the lens is a single body which may be composed of a single element, or multiple elements integrated into the single body.

58 Claims, 35 Drawing Sheets

OTHER PUBLICATIONS

Liau, Z.L., et al, "Accurate fabrication of anamorphic microlenses and efficient collimation of tapered unstable–resonator diode lasers," Appl. Phys. Lett., 64(25), pp 3368–3370 (1994).

Malacara, D.(ed), "Optical Shop Testing," John Wiley and Sons, App.2 (1978).

Mroziewicz, B., Bugjski, M., and Nakwaski, W., Physics of Semiconductor Lasers, North–Holland, Chpt. 5 (1991), pp. 225–256.

Rose, T.S., Hinkley, D.A., and Fields, R.A., "Efficient Collection and Manipulation of Laser Diode Output Using Refractive Micro–optics," SPIE vol. 2383, pp 273–277 (1995).

0.6750 MICRONS AT 0.0000, 0.0000 MM.
PEAK TO VALLEY IS 0.0726 WAVES 0.6750 MICRONS AT 0.0000, 0.0000 MM.
PEAK TO VALLEY IS 0.0345 WAVES 0.6750 MICRONS AT 0.0000, 0.0000 MM.
PEAK TO VALLEY IS 0.1864 WAVES 0.6750 MICRONS AT 0.0000, 0.0000 MM.
PEAK TO VALLEY IS 0.1893 WAVES

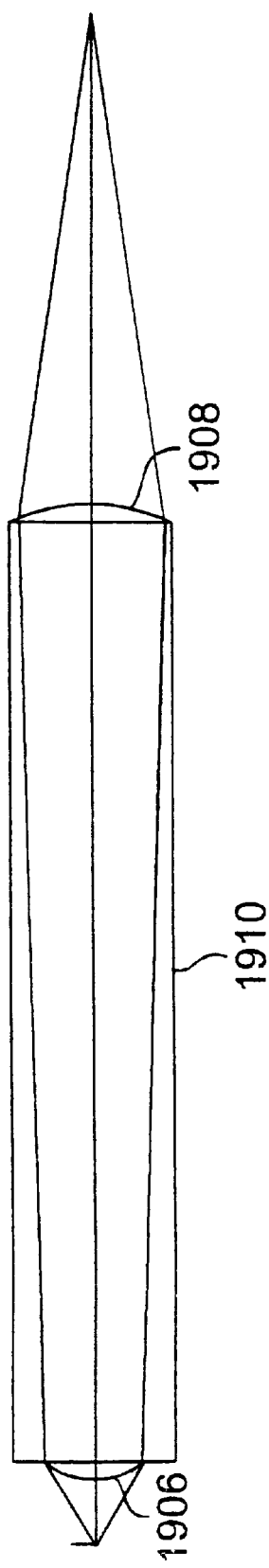
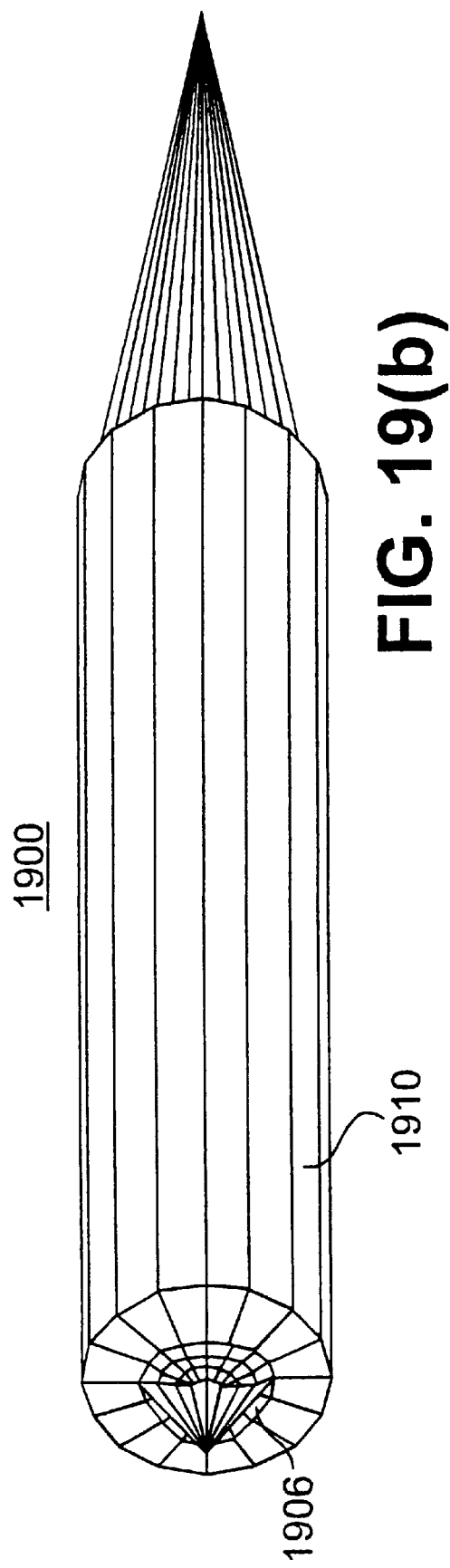

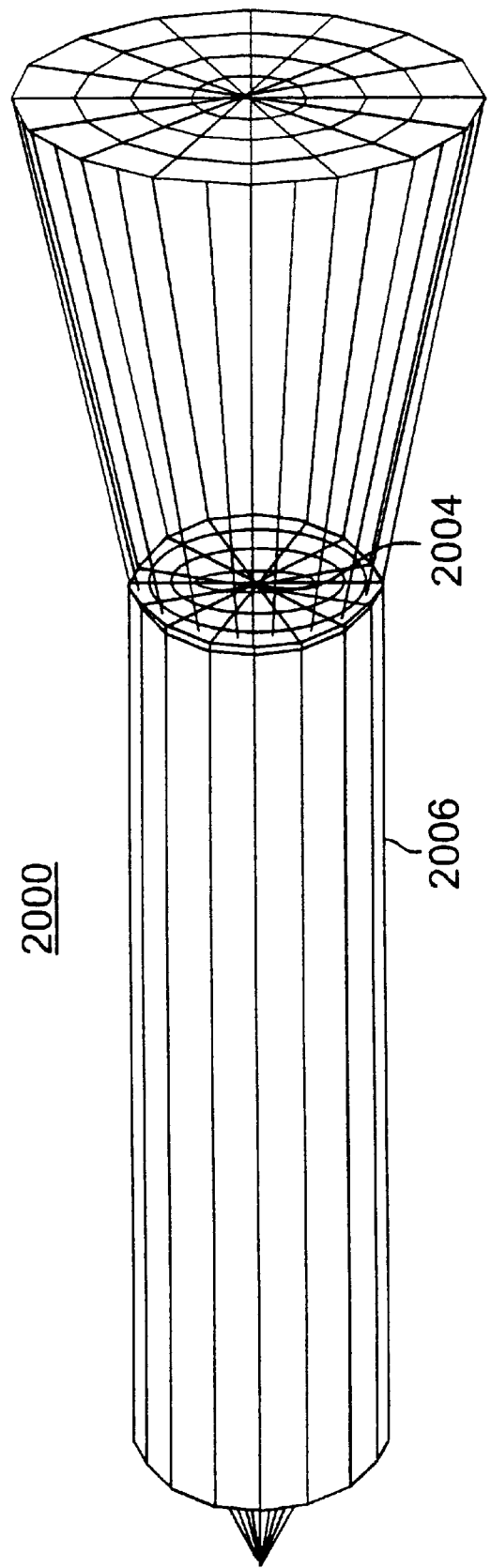

BEAM SHAPING OPTICS FOR DIVERGING ILLUMINATION, SUCH AS PRODUCED BY LASER DIODES

This application is a continuation in part of application Ser. No. 09/055,653, filed Apr. 6, 1998.

DESCRIPTION

1. Field of the Invention

The present invention relates to a lens (and method) for shaping a laser beam, especially a diverging fan beam from a laser diode, and relates particularly to, a lens comprising a single body that circularizes and collimates, or diverges, or converges the laser diode beam, and utilizes a correction profile which is a function of Zernike polynomials to reduce wavefront error in the beam. The lens may further eliminate astigmatism which may be present in the beam shape produced by the laser diode. The lens is suitable for use as part of a laser diode optical system, or for assembly with a laser diode.

2. Background of the Invention

Laser diodes are semiconductor devices that emit a laser beam useful for many applications, such as laser printing, laser scanning, optical data storage and fiber optic communications. FIG. 1 illustrates a typical laser diode 12 which emits a beam which is highly divergent and elliptical in cross-section as it extends from the laser diode, sometimes called a fan beam. The beam also diverges at different angles in the x and y directions, specifically, the beam is more divergent in the tangential plane (y-z plane), than in the sagittal plane (x-z plane) along optical axis z. Values typical for angles at which the beam intensity falls to 50% of the central intensity level of the beam is between 20 and 35 degrees in the tangential plane, and 7 and 14 degrees in the sagittal plane. Often, such beam divergence is characterized as its FWHM (Full Width at Half Maximum intensity).

The beam produced by laser diodes may also exhibit astigmatism, i.e., spatial amplitude variation, depending on the difference in position (or separation) along the optical axis of the apparent source of illumination in the laser diode in the tangential and sagittal planes. This difference can vary significantly depending on the type of laser diode. For example, gain-guided and tapered gain lasers typically exhibit on the order of 40 to 500 microns of separation, respectively, while index-guided lasers typically exhibit small amounts (<5 microns) of separation.

Conventionally, the problem of laser diode beam divergence, ellipticity, and astigmatism has been approached by adding a series of optical elements for shaping the beam into a circular and collimated (non-diverging) beam suitable for laser diode applications. For example, U.S. Pat. No. 5,321,717, describes a laser diode having an optical system with four elements, a collimator lens, a cylindrical lens and pair of prisms to collimate and circularize the laser diode beam, and to remove astigmatism. U.S. Pat. No. 5,553,174 describes a lens system having two cylindrical surfaces to correct for astigmatism and ellipticity of a laser diode beam, and an additional lens to collimate the beam. U.S. Pat. No. 5,467,335 describes a beam-shaping lens which corrects for astigmatism and ellipticity of the beam from a laser diode. This lens has a cylindrical first surface and a toric second surface, and requires an additional lens to collimate the beam. Rose et al., "Efficient Collection and Manipulation of Laser Diode Output Using Refractive Micro-optics," SPIE Vol. 2383, pp. 273–277 (1995), describes two separate lens elements for collimating and circularizing the beam from a laser diode. The use of multiple optical elements is undesirable since it is complex and requires mounting of several separate elements. This especially can be a drawback in small laser diode applications where space for optics is limited.

A single element lens for shaping a laser diode beam has been proposed by Liau et al., "Accurate fabrication of anamorphic microlenses and efficient collimation of tapered unstable-resonator diode lasers," Applied Physics Letters, Vol. 64 (25), pp. 3368–3370 (1994). Liau et al. describes a single plano-convex lens element that converts an astigmatic laser diode beam into a collimated, circular beam. The lens intercepts the beam emitted from the laser diode at a plane approximately 100 microns from the laser diode, where the tangential and sagittal extent of the beam's rays are the same (i.e., circular), and then collimates the beam at that plane. The Liau et al. lens is limited for use with laser diodes producing highly astigmatic beams. Further, the diameter of the beam is limited to its diameter at the plane where the tangential and sagittal extent of the beam's rays are the same.

U.S. Pat. No. 4,915,484 also proposes a single lens for shaping a laser diode beam. This lens has a first toric surface which corrects the large angle of divergence of the beam, and the second toric surface which corrects the smaller angle of divergence of the beam. These toric surfaces, which may be aspheric, do not sufficiently reduce wavefront error in the output beam from the lens. As a result, the lens has limited misalignment tolerance for centering the laser diode to the lens, because even slight misalignment (e.g., less than 2 microns) can introduce excessive wavefront error which will degrade the performance of the lens in shaping the beam from the laser diode. Moreover, such limited misalignment tolerance increases the risk of alignment errors during mounting of the lens and laser diode in optical applications, which can make it difficult to use the lens.

Thus, it would be desirable to provide a single lens for shaping a beam from a laser diode into a circular and collimated beam which has increased misalignment tolerances to make it easier to align the laser diode to the lens, does not depend on astigmatism for shaping the beam, and further provides a shaped beam having small wavefront error for subsequent optical processing.

SUMMARY OF THE INVENTION

Accordingly, it is the principal object of the present invention to provide an improved lens having a single body for shaping the beam from a laser diode into a circular and collimated, or converging, or diverging beam which does have the disadvantages of the prior art.

It is another object of the present invention to provide an improved lens for shaping the beam from a laser diode into a circular and collimated or converging, or diverging beam which can eliminate astigmatism of the beam.

A further object of the present invention is to provide an improved lens for shaping the beam from a laser diode having large misalignment tolerances, such as up to 10 microns, for centering the laser diode to the optical axis of the lens, as a result of a correction profile provided on the lens to reduce wavefront error in the beam exiting the lens.

Briefly described, the present invention is embodied in a lens having a body with two opposing ends and an optical axis along which the beam propagates. At one end of the body is a first toric surface and at the other end of the body is a second toric surface. The beam from the laser diode is incident the first surface. The first and second surfaces have curvature profiles which circularize (i.e., provides a circular beam cross-section) and collimate the beam or which cause the beam to diverge or converge. The curvature profile of at least one of the first and second surfaces has a correction profile which reduces wavefront error of the beam exiting the lens. This correction profile is a function of Zernike polynomials.

The curvature profile of the first surface of the lens refracts the beam's tangential and sagittal rays (or only the tangential rays) to reduce their difference in divergence to form an approximately circular beam in cross-section at the second surface. The curvature profile of the second surface of the lens refracts such rays from the first surface into an approximately collimated beam or a diverging or converging beam.

One feature of the present invention is that the reduction in wavefront error which results from the correction profile on the lens' body increases the misalignment tolerances for laser diode to lens centering over the prior art single beam shaping lens of U.S. Pat. No. 4,915,484. Such increase misalignment tolerance reduces the precision required for mounting the lens of the present invention in relation to the laser diode, thereby making such mounting easier and less prone to misalignment error.

The curvature profiles of the first and second surfaces of the lens may in addition to circularizing and collimating or converging or diverging the beam, compensate for astigmatism if present in the beam.

BRIEF DESCRIPTION OF THE DRAWINGS

The foregoing objects, features and advantages of the invention will become more apparent from a reading of the following detailed description in connection with the accompanying drawings, in which:

FIG. 2A shows the lens in the tangential (y-z) plane and FIG. 2B shows the lens in the sagittal (x-z) plane of the beam shown in FIG. 1;

FIG. 19(a) is a schematic diagram similar to FIG. 2A showing a lens in the tangential (y-z) plane for circularizing and converging a beam from a diode laser source, the lens being in accordance with another embodiment of the invention;

FIG. 19(b) is a three-dimensional or perspective view of the lens of FIG. 19(a) taken from the source side, the lines on the lens being virtual or construction lines to illustrate the curvatures of the lens body and the curvature profile of the end of the lens on the source side of the body;

FIG. 20(c) is a view similar to FIG. 19(c) but for the lens of FIG. 20(a); and

DETAILED DESCRIPTION OF THE INVENTION

Figure 1:
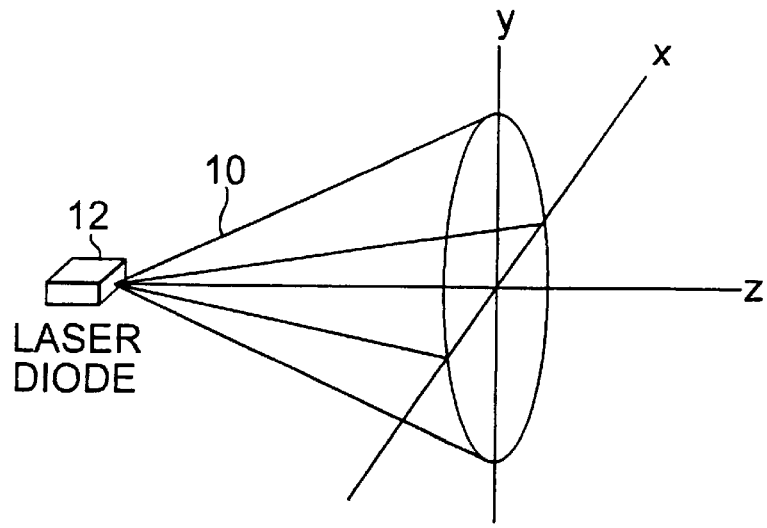
FIG. 1 is a perspective view the beam produced by a typical laser diode.
Figure 2A:
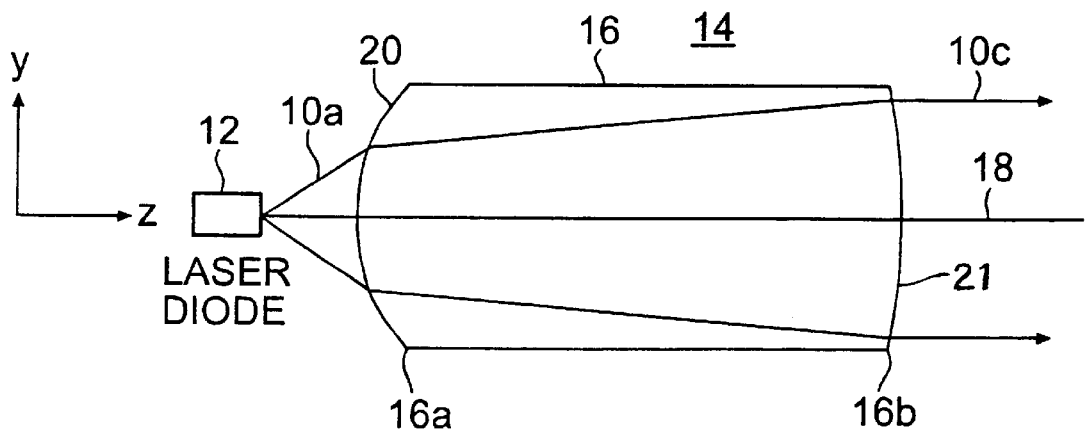
FIGS 2A and 2B are block diagrams of the lens in accordance with the present invention where
Figure 2B:
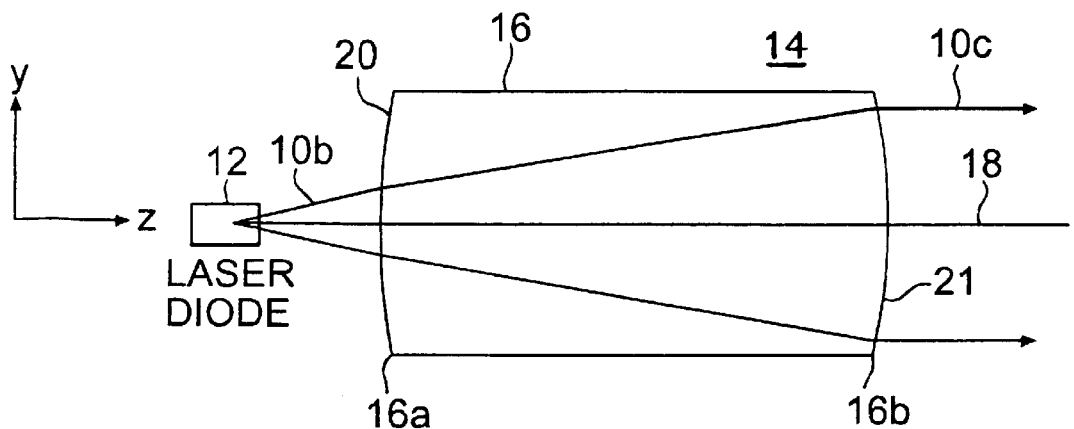

Referring to FIGS. 2A and 2B, a lens 14 of the present invention, which provides a collimated beam, is shown in the tangential and sagittal planes, respectively. The tangential and sagittal planes represent the y-z and x-z planes, respectively, as defined for the laser diode 12 and beam 10 of FIG. 1. Lens 14 includes a body 16 and an optical axis 18, which is along the z-axis. A first toric surface 20 and a second toric surface 21 are provided at opposite ends 16a and 16b, respectively, of the body 16. (The term toric surface may encompass other types of toric or toroid surfaces, such as cylindrical and spherical surfaces.) The toric centers of first and second surfaces 20 and 21 are coincident with the optical axis 18 of the lens. Marginal rays of the beam 10 are shown leaving the laser diode 12 and passing through both surfaces 20 and 21 of lens 14, where marginal rays 10a correspond to those from laser diode 12 at the largest angle in the tangential plane with respect to the optical axis 18, and marginal rays 10b correspond to those from laser diode 12 at the largest angle in the sagittal plane with respect to the optical axis 18. Beam 10 within marginal rays 10a and 10b also represent positions of constant intensity of the beam. Beam 10 is circularized and collimated by lens 14, and in particular, by surfaces 20 and 21, into an output beam 10c.

Astigmatism is shown, for example, in FIGS. 2A and 2B by the sagittal rays 10b of beam 10 originating from a point inside the laser diode 12, whereas the tangential rays 10a originate from a point on the surface of the laser diode. Depending on the laser diode 12, beam 10 may or may not exhibit astigmatism. The lens of the present invention can be used shape both astigmatic and non-astigmatic beams, and hence does not depend on astigmatism to shape the beam.

Lens 14 refracts the marginal rays in the tangential and sagittal planes 10a and 10b, respectively, such that their ray height (i.e., perpendicular distance of the ray from optical axis 18) is the same at the second surface 21 of the lens 14. Thus, the beam when collimated at the second surface has a circular intensity profile, i.e., circular cross-section. This circularizing of the beam is achieved by a combination of the curvature profile of the first surface in tangential and sagittal planes (or only in the tangential plane) and the thickness of lens body 16 between ends 16a and 16b. Further, the curvature of the first surface 20 in the tangential plane is greater than that in the sagittal plane. Accordingly, the first surface 20 refracts the tangential rays 10a more strongly than the sagittal rays 10b, such that their ray heights are the same at the second surface 21, as shown in FIGS. 2A and 2B.

The curvature profile of the second surface 21 ensures that the beam exiting lens 14 is collimated. The curvature of the second surface 21 in the tangential plane is smaller than that in the sagittal plane, which is because the tangential marginal ray angle (i.e., the angle between tangential marginal rays 10a and optical axis 18) at the second surface 21 is smaller than the sagittal marginal ray angle (i.e., the angle between sagittal marginal rays 10b and optical axis 18) at the second surface. Although the tangential and sagittal marginal ray angles may different, this difference may be relatively small due to the large thickness of the element, which for example, may be approximately 4.5 mm. Accordingly, the difference in curvatures of the second surface 21 in the tangential and sagittal planes may also be relatively small to refract the beam in the tangential and sagittal planes.

Sight alterations to the curvatures of both first and second surfaces 20 and 21 can be made to correct for any astigmatism in the beam, if necessary, and thereby remove such astigmatism. Also, a correction profile is provided on at least one of the first and second surface 20 and 21 of the lens 14 for reducing wavefront error. This correction profile will be described later in more detail.

The curvature profile of the first surface 20 to refract the beam in the tangential plane (and sagittal plane, if needed) and the curvature profile of the second surface 21 to collimate the approximately circular beam from the first surface depends on the particular divergence characteristics of the beam 10 produced by the laser diode 12 and the desired diameter of the collimated output beam 10c from lens 14, in addition to the thickness of the lens body 16.

The following theory is presented to describe the lens and the curvature profiles of first and second surfaces 20 and 21. This theory is not meant to limit the lens to other theories which can be used to define the lens and curvature profile of the first and second surfaces.

The curvature profile of the first and second surfaces may be defined in terms of sag. The term sag (or surface sag) refers to the difference in distance between a position along the lens' surface and a reference plane facing the lens' surface, where this plane is perpendicular to the optical axis of the lens. Fabrication methods to produce the curvature profile of the first and second surfaces of the lens are typically limited by the maximum allowable surface sag. Thus, it is useful to determine the maximum surface sag to determine whether the lens can actually be fabricated by a particular method. The sag of the toric lens surfaces 20 and 21 of the lens increases from the center (at the optical axis) to the edge of the lens, thus, the maximum surface sag is at the edge of lens' surface. Since the curvatures of both first and second surfaces 20 and 21 (and therefore the surface sags) in the tangential plane is greater than or approximately equal to those in sagittal plane, the below equations are only based on ray paths through lens 14 in the tangential plane, i.e., the plane where the greatest surface sag should likely occur in the lens.

Figure 3:
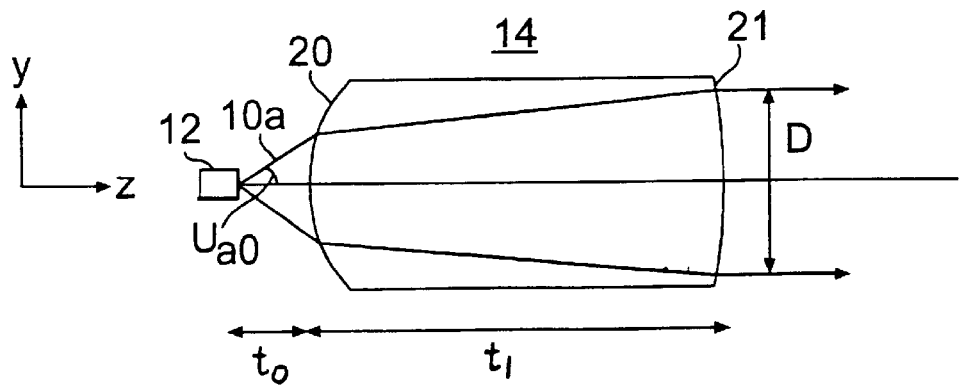
FIG. 3 is the block diagram of the lens of FIG. 2A illustrating variables defining the geometry of the lens.

Referring to FIG. 3, the geometry of several variables defining lens 14 are shown. D is the diameter of the output beam, n is the refractive index of the lens, $u_{a0}$ is the tangential marginal ray angle between the laser diode 12 and the first surface 20, $t_0$ is the distance between the laser diode 12 and the first surface 20, and $t_1$ is the thickness of the lens. The body 16 of the lens consists of a thick element with two plano-convex surfaces 20 and 21. Body 16 may be composed of typical optical material, such as glass. Using paraxial ray trace equations, such as described in Kingslake, *Fundamental of Lens Design*, Academic Press, Chapter 3 (1978), the following equations can be written for the powers $\phi_1$ and $\phi_2$ of the first and second surfaces 20 and 21, respectively:

$$\phi_2 = 2\frac{u_{a0}}{D}(1 - t_0\phi_1) \quad (1)$$

$$\phi_1 = \left[\frac{n\left(\frac{D}{2u_{a0}} - t_0\right)}{t_1} - 1\right] \cdot \frac{1}{t_0} \quad (2)$$

The sags of the first and second surfaces $S_1$ and $S_2$ in the tangential plane, respectively, are:

$$S_1 = R_1 - \sqrt{R_1^2 - (t_0 u_{a0})^2} \quad (3)$$

-continued $$S_2 = R_2 - \sqrt{R_2^2 - (D/2)^2} \quad (4)$$

where $R_1=(n-1)/\phi_1$, and $R_2=(n-1)/\phi_2$.

Figure 4:
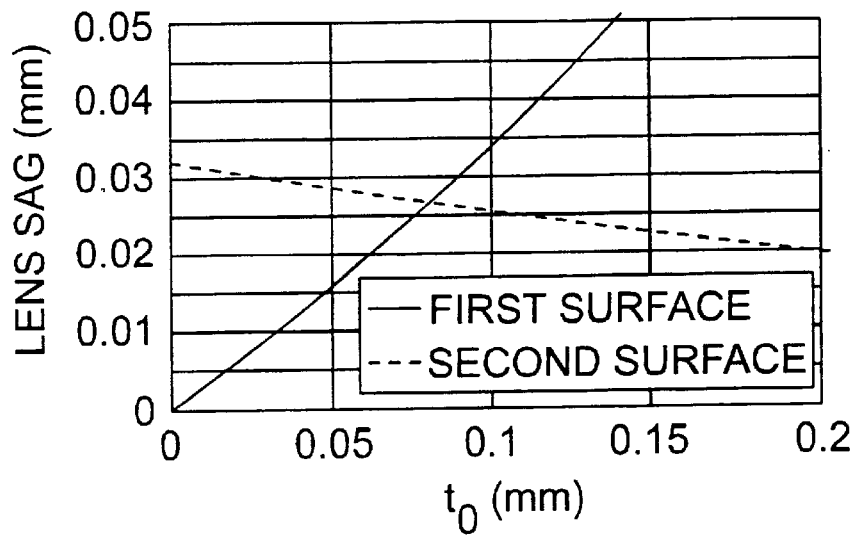
FIG. 4 is a graph of the curvatures (in terms of sags) for the first and second surfaces of the lens in the tangential plane as a function of the separation ($t_0$) between the laser diode and the lens.
Figure 5:
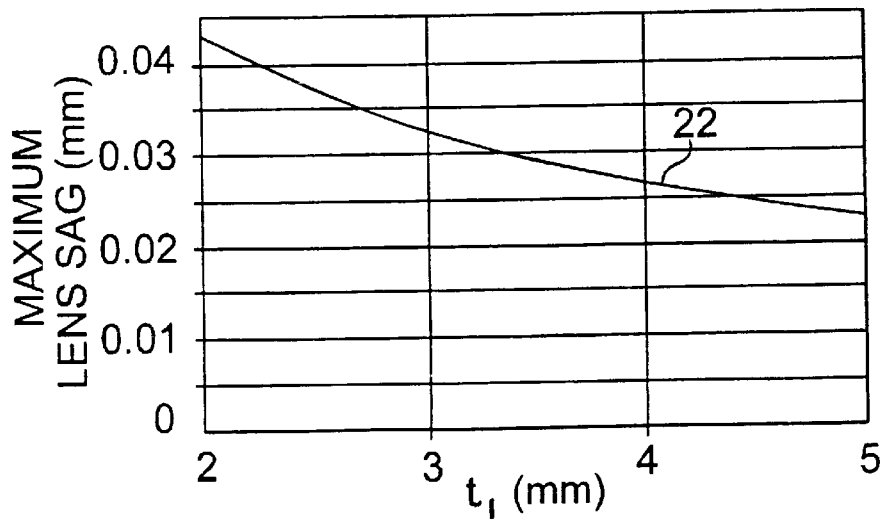
FIG. 5 is a graph of the maximum required surface sags of the first and second surfaces of the lens in the tangential plane as a function of lens thickness ($t_1$)

Using Equations (3) and (4), the maximum required sags for surfaces 20 and 21 can be approximately determined for a given set of parameters. For example, FIG. 4 shows a plot of the sags for first surface 20 and second surface 21 versus $t_0$, the distance between the laser diode 12 and the lens 14, using the following parameters: n=1.55, $u_{a0}$=tan(30°)= 0.5236 radians, D=0.6 mm, and $t_1$=4.0 mm. The curves for the first (solid) and second (dashed) surfaces intersect for sags of $S_1=S_2=0.027$ mm at the distance $t_0$=0.080 mm. This intersection point defines the maximum sag required. The maximum sag required can be adjusted by changing the value of $t_1$, the thickness of the lens, such as shown in the FIG. 5 plot of maximum lens sag versus $t_1$, where $t_0$ is set to 0.080 mm. This plot is the result of multiple plots (not shown) of the intersection points of $S_1$ and $S_2$ as $t_1$, is varied between 2 mm and 5 mm. In this example, the maximum sag requirement, 0.027 mm, based on FIG. 4 at $t_1$=4.0 mm is indicated by the dot labeled 22, and if, for example, $t_1$ was increased to 5 mm, the maximum required sag would be reduced to 0.23 mm.

With the above determination that the estimated maximum required sag of the lens 14 can be fabricated at desired parameters of D, $t_0$, $t_1$, and n, for a beam having a tangential marginal ray angle $u_{a0}$, a complete design of lens 14 may be generated using a commercially available lens design programs operating on a computer, such as the Zernax program developed by Focus Software, Inc. of Tucson, Ariz., or the CodeV program developed by Optical Research Associates, Inc., of Pasadena, Calif. The embodiments discussed later were generated using the Zernax program.

Figure 6:
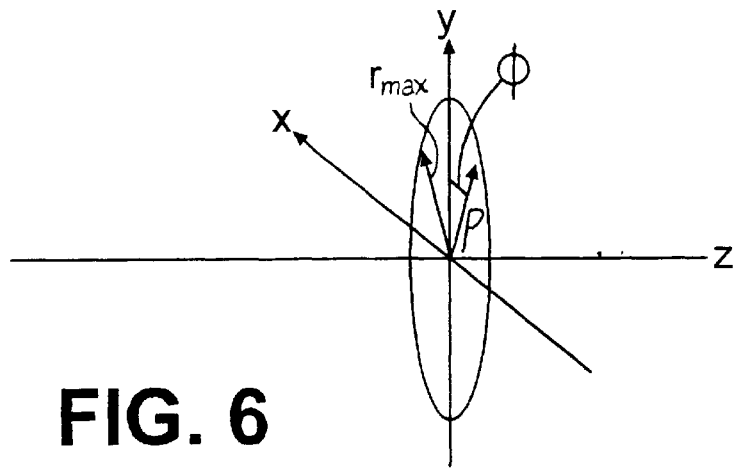
FIG. 6 is a diagram illustrating variables defining the geometry of the lens in the x, y, z plane for calculating the correction profile for the lens.

Wavefront error of the beam shaped by lens 14 is reduced by the addition of a correction profile to the curvature profile of at least one of the first and second surface 20 and 21 of lens 14. This correction profile is based on a high-order correction using Zernike polynomials, such as described, for example, in Malacara (ed.), *Optical Shop Testing*, John Wiley and Sons, Appendix 2 (1978). Preferably, the correction profile is added to the second surface. However, the correction profile may be added to the first surface, or both surfaces, if desired. The following equation expresses the sag as an x,y coordinate (two-dimensions) on one of the first and second surfaces with the correction profile, in which the first term represents the sag of the toric surface in both the tangential and sagittal planes and the second term is the correction profile:

$$z(x, y) = \frac{y^2/R_y + x^2/R_x}{1 + \sqrt{1 - (1+k_y)y^2/R_y^2 - (1+k_x)x^2/R_x^2}} + Z(\rho, \phi) \quad (5)$$

where y is the distance from the optical axis 18 along the y-axis, x is the distance from the optical axis along the x-axis, $k_x$ and $k_y$ represents the conic constant along the x-axis and y-axis, respectively, $R_x$ and $R_y$ are the radius of curvature of the lens along the x-axis and y-axis, respectively, $Z(\rho, \phi)$ are Zernike polynomials, such as set forth below, and p is a normalized radial coordinate given by $(x^2+y^2)^{1/2}/r_{max}$, where $r_{max}$ is the maximum radial distance from the optical axis to the edge of the lens' surface, and $\phi$ is the angle between $\rho$ and the y-axis. FIG. 6 shows the geometric relationship of $r_{max}$, $\rho$, and $\phi$ along the x,y,z axes.

In most cases, the following Zernike terms are required for providing the necessary correction profile: $Z(\rho,\phi) \sim A_0 +$ $A_2\rho \sin(\phi) + A_4\rho^2 \cos(2\phi) + A_8(6\rho^4-6\rho^2+1)A_9\rho^3 \cos(3\phi) + A_{10}\rho^3 \sin(3\phi) +_{11}(4\rho^2-3)\rho\rho^2 \cos(2\phi) + A_{16}\rho^4 \cos(4\phi) + A_{27}(6\rho^2-5)\rho^4\cos((4\phi) + A_{20}(\rho^4-20\rho^2+6)\rho^2 \cos 2\phi$. Zernike terms may be added or subtracted as desired for the lens. The correction profile based on Zernike terms provides a two-dimensional correction of wavefront error.

Figure 8A:
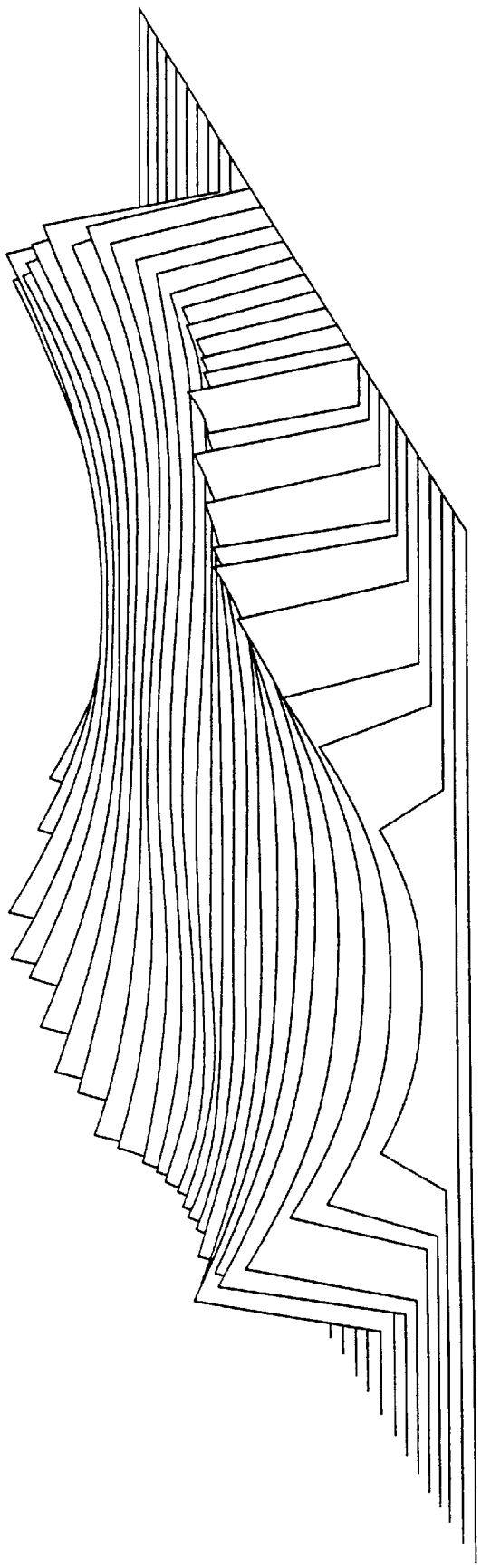
FIG. 8A is a plot of the wavefront error in terms of number of waves (also called Optical Path Difference-OPD) of a beam using the lens of FIGS. 7 and 7A without a correction profile where the laser diode is centered on the optical axis of the lens (on-axis)
Figure 8B:
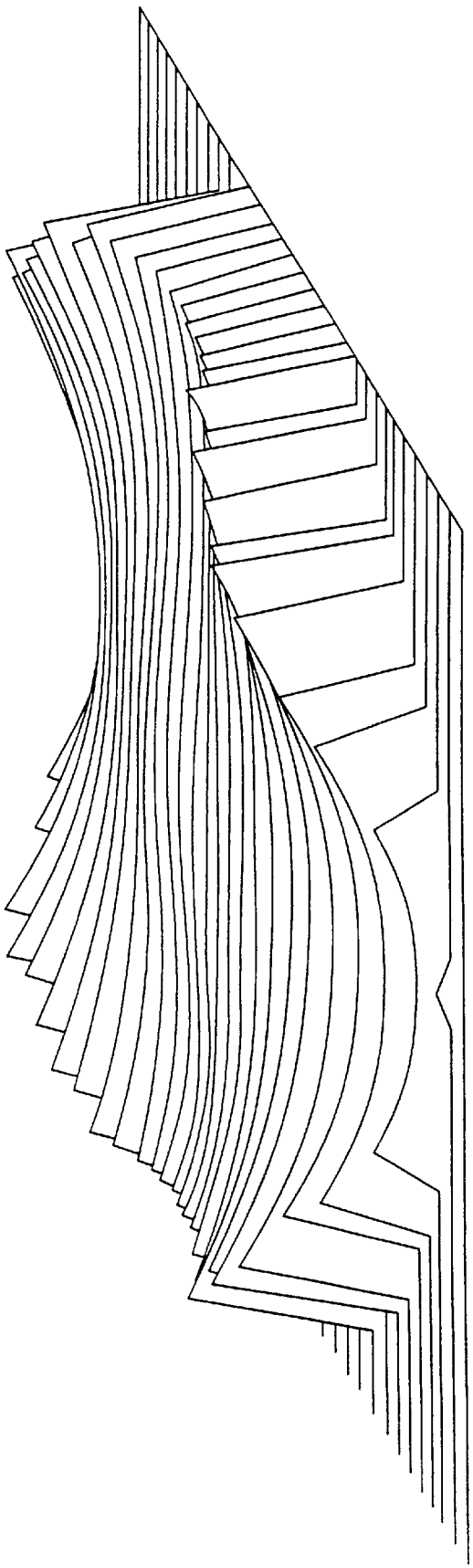
FIG. 8B is another plot of the wavefront error of the beam using the lens of FIGS. 7 and 7A without a correction profile where the laser diode is de-centered 2 microns off the optical axis of the lens (off-axis)
Figure 9A:
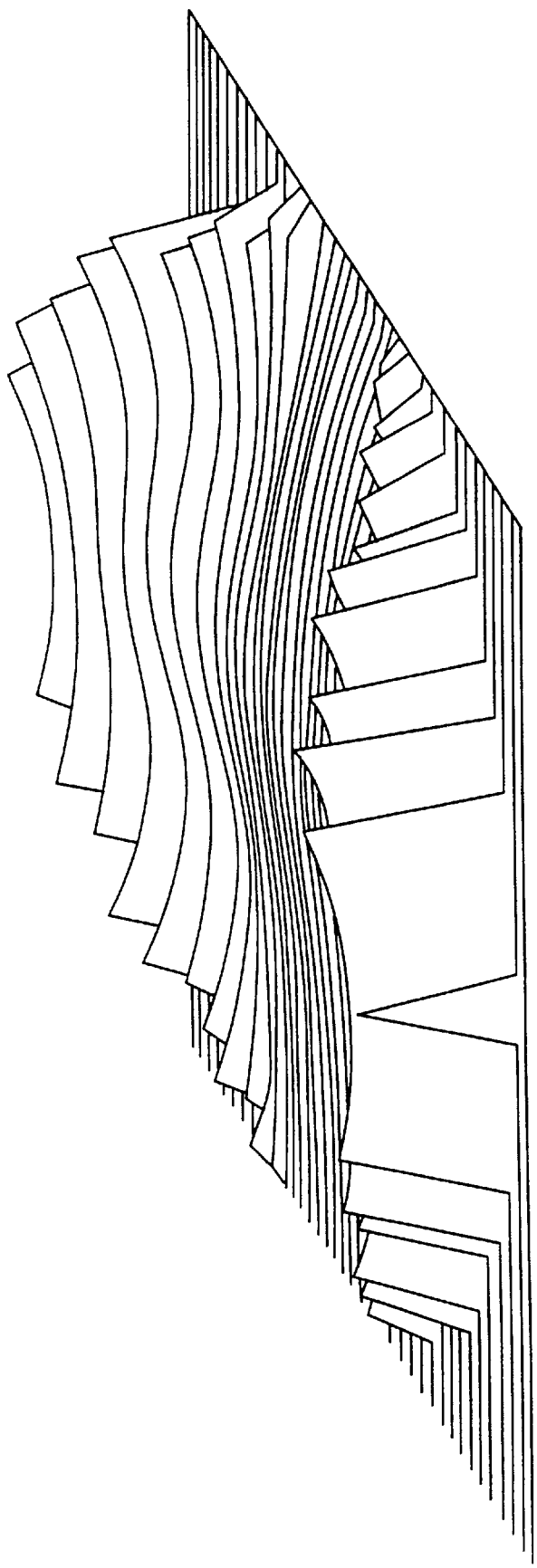
FIG. 9A is a plot of the wavefront error of a beam using the lens of FIGS. 7 and 7A with a correction profile where the laser diode is centered on-axis the lens.
Figure 9B:
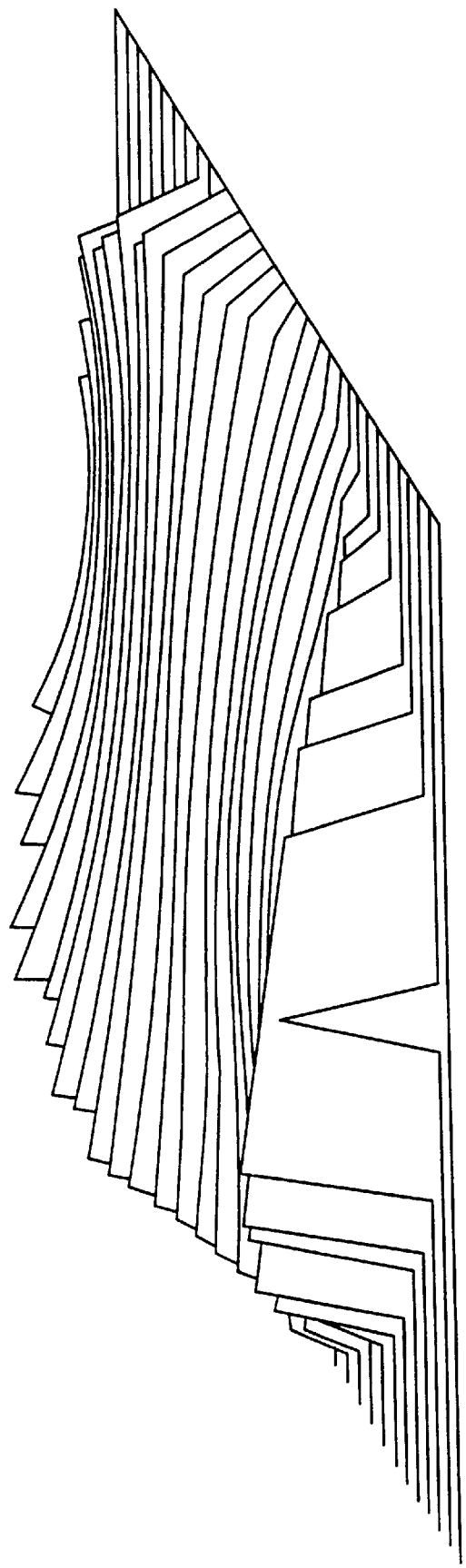
FIG. 9B is another plot of the wavefront error of a beam using the lens of FIGS. 7 and 7A with a correction profile where the laser diode is de-centered 2 microns off-axis the lens.

The correction profile is calculated by first determining the wavefront error in terms of the optical path difference (OPD) of the beam for at least two field points, one on-axis and the other off-axis. The term on-axis refers to when the laser diode (and consequently beam 10) is centered on the optical axis of the lens, and the term off-axis refers to a decentration of the laser diode from the optical axis, such as between 2 and 10 microns. For example, FIGS. 8A and 8B show OPD plots for on-axis and off-axis points, respectively. On the OPD plot, the measure of wavefront error is the number of waves peak-to-valley shown. Next, a weighted average of the OPD's plotted on-axis and off-axis are best fitted to a Zernike polynomial set, and the resulting profile is converted into a correction profile, in terms of sag S(x,y), in accordance with the following expression:

$$S(x, y) = \frac{\lambda \cdot OPD(x, y)}{n - 1} \quad (6)$$

where OPD(x,y) is the optimized Optical Path Difference (in waves) in the exit pupil of the lens, $\lambda$ is the wavelength of the beam, and n is the refractive index of the lens material. The correction profile may then be added to the lens' surface being corrected for wavefront error. The on-axis and off-axis OPD plots may be re-plotted to show the reduced wavefront error by the correction profile on the lens, such as shown in FIGS. 9A and 9B, where the correction profile was calculated using the OPDs of FIGS. 8A and 8B and added to the curvature profile of second surface 21. This calculation of the correction profile may be facilitated by the use of the lens design software described earlier. The correction profile of the lens is thus a function of both the Zernike polynomials and of the offset of the laser diode from the lens' optical axis (off-axis).

The use of the correction profile does not limit the lens from adding asphericity to either the first or second surfaces of the lens, i.e., a one-dimensional correction of wavefront error along either the x or y axis of the surface. Such asphericity of the lens can be expressed by adding a conic constant or higher-order terms. For example, in the x direction, the sag of one of the lens surfaces 20 and 21 with such terms can be expressed as:

$$S(x) = \frac{x^2/R_x}{1 + \sqrt{1 - (k_x+1)x^2/R_x^2}} + A_4x^4 + A_6x^6 + A_8x^8 + \ldots \quad (7)$$

where $A_4$, $A_6$, and $A_8$ are constant coefficients. Similar adjustments for sag may be made separately in the y direction. Furthermore, the first or second surfaces 20 or 21 (or both) of lens 14 may have a diffractive component (or element) as either part of the curvature of the surface, or integrated into the lens' body 16. This diffractive component may be useful for providing chromatic aberration correction of the beam.

Fabrication of the curvature profiles of first and second surfaces 20 and 21 of the lens 14 may be provided by optical lithography, electron-beam lithography, single-point pattern generation, or other similar methods for producing shaped surface profiles. Single-point laser pattern generation is particularly suitable for producing high quality lens surfaces. Single-point laser pattern generation is described in U.S. Pat. Nos. 4,846,552 and 5,148,319, and in Faklis et al., "Continuous phase diffractive optics using laser pattern generation," SPIE Holography Technical Group Newsletter, Vol. 2, No. 2 (1993), and Gale et al., "Fabrication of continuous-relief micro-optical elements by direct laser writing in photoresists," Optical Engineering, Vol. 33, No. 11, pp.3556–3566 (1994). This method focuses a laser beam, typically from a helium-cadmium laser or argon-ion laser, to a small spot. This spot is used to expose a layer of photopolymer (or photo-resist) which has been applied to the surface of the substrate to be shaped. The substrate may be glass. As the focused laser beam is translated (such as a raster scan) across the surface, the intensity of the beam is varied. The photo-polymer is then developed and the desired surface-relief profile obtained. The developed photopolymer may be used as a lens surface, or the photo-polymer may be etched such that the desired surface-relief profile is formed in the underlying substrate to make a lens surface from the substrate. A relatively smooth toric surface of a desired curvature profile can thus be fabricated.

A presently preferred method of fabricating lenses provided by this invention is described in detail in U.S. patent application Ser. No. 09/094,340, filed Jun. 9, 1998 and entitled: Methods of Making Optical Microstructures which can have Profile Heights Exceeding Fifteen Microns.

Briefly described, this manufacturing process is based upon the exposure of a photosensitive material to a spatially variable dose of electromagnetic energy to create a surface-relief structure upon development of the photosensitive material. A coating of the photosensitive material onto a substrate of interest (planar or otherwise) is characterized by its response curve in terms of developed relief depth to electromagnetic exposure energy and wavelength.

The response curve is a complex function of the material parameters as well as the method with which the coating, exposure, and development process steps are performed. For instance, the material's viscosity, in conjunction with the coating parameters (spin speed in the case of spin-coating, pull rate in the case of dip coating, etc.), will dictate the final film thickness. During exposure, the wavelength of the radiation used, in conjunction with pre-exposure procedures (such as the temperature and duration of an oven bake), complex index of refraction of the photosensitive material, and chemical compound of the material being exposed, are examples of some of the parameters that will dictate the sensitivity of the material, and therefore rate of development. Development procedures can also vary the response curve. Development time and development solution used affect development rates, but so will the exact method of development. In the case of aqueous development, the response curve will change if one uses immersion, spray, or puddle methods of developing the photosensitive material. For the photosensitive material chosen, the coating, exposure, and development parameters are controlled to achieve the precision microstructures desired.

The resulting microstructure in the photosensitive material can remain in the material, or be etch-transferred into the underlying substrate. The microstructure can also be replicated into a polymer material via a cast-and-cure, embossing, compression molding, or compression injection molding process. The manufacturing process is robust in that arbitrary surface-relief structures can be fabricated that have optical and mechanical properties of interest.

With a laser pattern generation (LPG) method, one exposes photoresist using a single or multiple focused laser beam that rasters across a photosensitive substrate. There are two scanning geometries that are generally preferred: x-y scanning, where the substrate is moved on a pair of orthogonal linear stages; and r-θ scanning, where the substrate is spun on an air bearing spindle. In the x-y scan systems, the part is scanned below a single or multiple focused laser beams. For photoresist that is sensitive in the blue or UV portions of the electromagnetic spectrum, the radiation source used is typically an argon-ion, krypton-ion, or helium-cadium laser. With advances in semiconductor laser diodes, these gas lasers may be replaced in the design of LPGs. To spatially vary the exposure dose the photosensitive material is exposed to, one can vary the speed of the stages moving the focused exposure beams or the substrate. This changes the dwell time of the exposure beam. A more accurate method of controlling the exposure dosage is to vary the intensity of the writing beam or beams. Methods for accomplishing this include the use of an electro-optic or acousto-optic modulators, with diode lasers that will operate in the blue or UV portion of the electromagnetic spectrum, in which the drive current of the laser can be directly modulated to vary the outputted laser beam's power. A computer controls the modulator and computes, based upon the desired surface-relief pattern and the response curve of the photosensitive material, the modulation sequence required. After the relief pattern has been developed, the element can be used as is, or one can transfer the desired pattern into the substrate using an etch process. The patterned surface can also be used as the master element for a replication process.

A gray-scale mask lithography exposure method may alternatively be used. In this method, photoresist is exposed using a mask whose transmission $T(x,y)$ varies spatially in x and y. By passing a beam of uniform or well-defined intensity variation $I_{inc}(x,y)$ through this mask, the transmitted beam can have a controlled intensity function $I_{out}(x,y) = I_{inc}(x,y) T(x,y)$. The intensity function can be used to expose photoresist, or any other photosensitive material once one has a well-characterized response curve for the material.

Other exposure methods include the use of moving apertures and controlled diffraction effects in order to achieve the surface-relief profiles desired. With the moving aperture method, an amplitude mask is translated in front of an electromagnetic exposure beam. By choosing the amplitude distribution of the mask and the path with which the mask and/or substrate is being translated, one can control the spatial distribution of the exposure dose for a particular photosensitive material. Another method of achieving desired surface-relief profiles is to expose a photosensitive material to the intensity of a diffracted electromagnetic beam. The diffraction profile can be achieved by controlling the temporal and spatial coherence of an exposure beam, controlling the aperture shape the radiation is diffracting around, as well as the distance or focus a beam through a pinhole in order to create an exposure dosage that is circularly symmetric but decreases radially. By tailoring the exposure profile to the response curve of the photosensitive material (and vis-versa) one can then write and develop the microlens structure.

The body 16 of the lens represents a single, monolithic body which is composed of a single element consisting of a single material, such as glass or plastic. For example, the body may be injection molded of such material. The body 16 of the lens may also be composed of multiple elements which are integrated together to provide the single body, such as by cement or glue. Such multiple element may include an optical substrate, and two optical elements (which may be lenses) providing the first and second surfaces 20 and 21. The two optical elements are attached to the optical substrate, which separates such elements, such that their toric centers are aligned together through the substrate along the optical axis of the lens. The substrate may consist of two movable sections that can be fixed with respect to one another to facilitate such alignment. Fixing the two sections can be performed by gluing them together.

Figure 7:
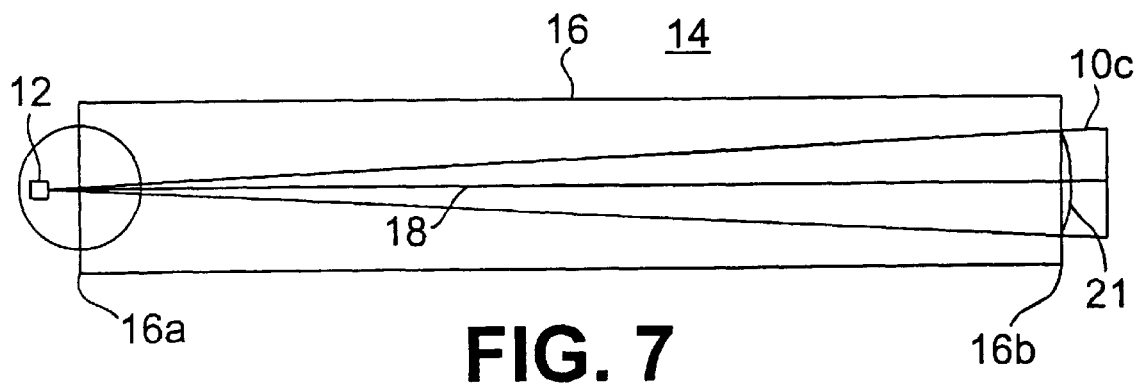
FIG. 7 is a block diagram of the lens in accordance with one embodiment of the lens showing the first and second surfaces shaping the tangential and sagittal rays of a beam produced by a laser diode.
Figure 7A:
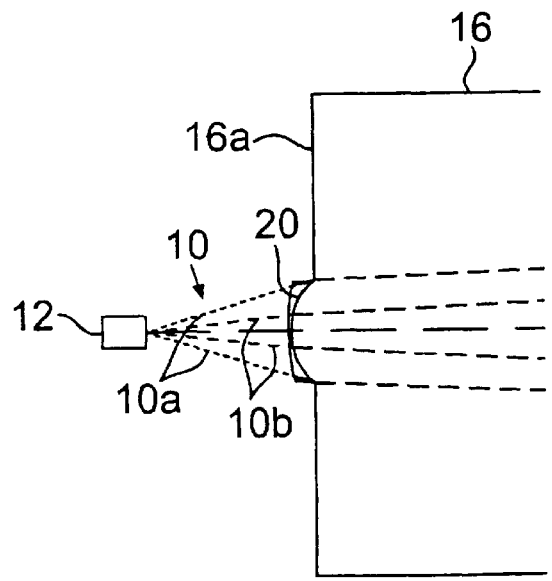
FIG. 7A is an enlarged view of the part of the lens circled in FIG. 7 showing the beam as it enters the lens.

Referring to FIGS. 7 and 7A, lens 14 is shown having a body 16 composed of a single element with two plano-convex surfaces corresponding to surfaces 20 and 21. (The parts of the lens in these figures are labeled identical and are the same as those described earlier in connection to FIGS. 2A and 2B). The laser diode has a FWHM specification of 21 (tangential)×8 (sagittal) degrees and produces a beam having the wavelength 675 nm. The astigmatism of the laser diode is considered negligible and thus assumed to be zero. The $1/e^2$ beam diameter (diameter at which the beam intensity is equal to 0.13534 times the intensity at the center of the beam) is equal to 0.50 mm. The full (unvignetted) diameter of the output beam is equal to 0.61 mm. The thickness of the lens, $t_1$, is equal to 4.551 mm. The maximum surface sags of the first and second surface 20 and 21, respectively, are 0.016 mm and 0.035 mm. The remainder of the lens' specifications is shown in the following table:

| $R_t$ (mm) | k | $R_s$ (mm) | t (mm) | n |
|---|---|---|---|---|
| — | — | — | 0.131 | 1.0 |
| 0.094 | −3.1900 | 0.227 | 4.551 | 1.555 |
| −1.938 | −3.4822 | −1.7369 | | 1.0 |

$R_t$ and $R_s$ are the radii of curvature in the tangential and sagittal planes, respectively, k is the conic constant in the tangential plan, t is the thickness, and n is the refractive index. Lens 14 shapes beam 10 emitted from laser diode 12 into an output beam 10c which is circular and collimated.

Two field points, one on-axis and the other off-axis, will be used to show the effect on wavefront error by the addition of a correction profile which is a function of Zernike polynomials to the second surface 21 of the lens 14. FIG. 8A shows the wavefront error of a beam without the correction profile to the second surface for an on-axis field point, while FIG. 8A shows the wavefront error of a beam without the correction profile to the second surface for an off-axis field point. The off-axis point corresponds to a 2 micron radial decentration of the laser diode from the optical axis of the lens (a decentration of 1.414 microns along each of the x and y axes). Wavefront error in these figures is in terms of Optical Path Difference (OPD), where the measure of wavefront error is the number of waves peak-to-valley. Before the correction profile is added to the lens, the peak-to-valley OPD is 0.187 (on-axis) and 0.207 (off-axis) waves.

A weighted average of the OPDs shown in FIGS. 8A and 8B were best fit to a Zernike polynomial set with 36 terms. The resulting profile was converted to a sag profile using Equation (6), and added to the second surface. FIG. 9A shows the resulting wavefront with the correction profile on the second surface for an on-axis field point, while FIG. 9A shows the wavefront error with the correction profile on the second surface for an off-axis field point. With the correction profile, the lens has a peak-to-valley OPD of 0.034 (on-axis) and 0.073 (off-axis) waves, a significant reduction in wavefront error.

Figure 10:
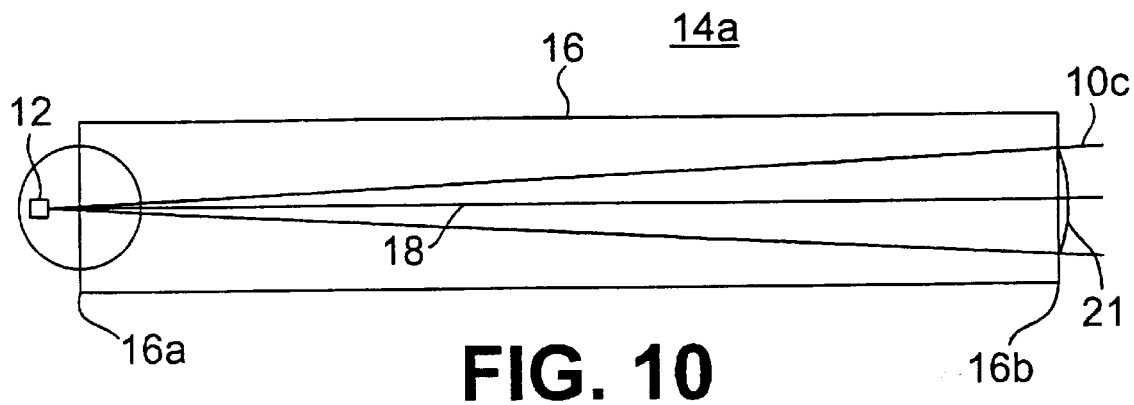
FIG. 10 is a block diagram of the lens in accordance with another embodiment of the lens showing the first and second surfaces shaping the tangential and sagittal rays of a beam produced by a laser diode.
Figure 10A:
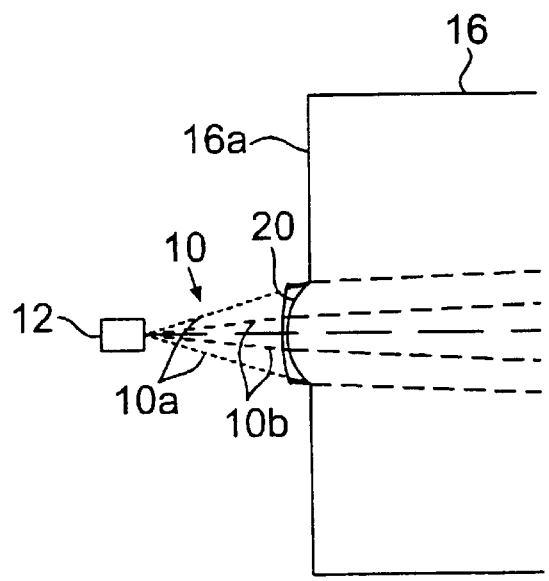
FIG. 10A is an enlarged view of the part of the lens circled in FIG. 10 showing the beam as it enters the lens.

In accordance with another embodiment, a laser diode exhibiting astigmatism can be accommodated to provide a circularized and collimated beam exiting the lens. Referring to FIGS. 10 and 10A, a lens 14a is shown having a single element body 16 with two plano-convex surfaces corresponding to surfaces 20 and 21. Lens 14a represents lens 14 in accordance with this embodiment. (The parts of the lens in these figures are labeled identical and are the same as those described earlier in connection to FIGS. 2A and 2B). The laser diode may, for example, have FWHM at 21 (tangential)×8 (sagittal) degrees, and produces a beam of wavelength 675 nm. The astigmatism of the laser diode is equal to 5 microns. This value represents the distance along the optical axis between the effective source points for the tangential and sagittal planes. The source point for the sagittal plane is located 5 microns within the laser diode. The source point for the tangential plane is located at the output facet of the diode. The $1/e^2$ beam diameter (diameter at which the beam intensity is equal to 0.13534 times the intensity at the center of the beam) is equal to 0.50 mm. The full (unvignetted) diameter of the output beam is equal to 0.61 mm. The thickness of the element, $t_1$, is equal to 4.551 mm. The maximum surface sags of the first and second surface 20 and 21, respectively, are 0.016 mm and 0.035 mm. The remainder of the lens' specifications is shown in the following table:

| $R_t$ (mm) | k | $R_s$ (mm) | t (mm) | n |
|---|---|---|---|---|
| — | — | — | 0.131 | 1.0 |
| 0.094 | −3.1907 | 0.2344 | 4.551 | 1.555 |
| −1.938 | −3.4938 | −1.741 | | 1.0 |

$R_t$ and $R_s$ are the radii of curvature in the tangential and sagittal planes, respectively, k is the conic constant in the tangential plan, t is the thickness, and n is the refractive index.

Figure 11A:
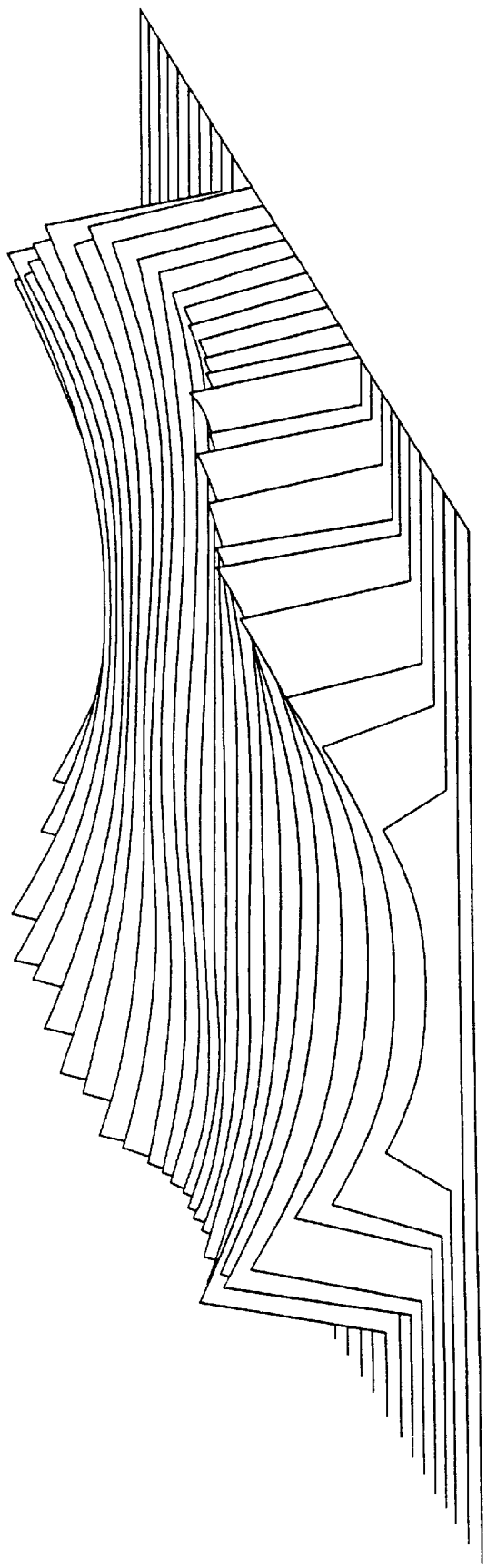
FIGS. 11A, 11B, 12A, and 12B are plots of wavefront error similar to FIGS. 8A, 8B, 9A, and 9B, respectively, in accordance with the lens of FIGS. 10 and 10A.
Figure 11B:
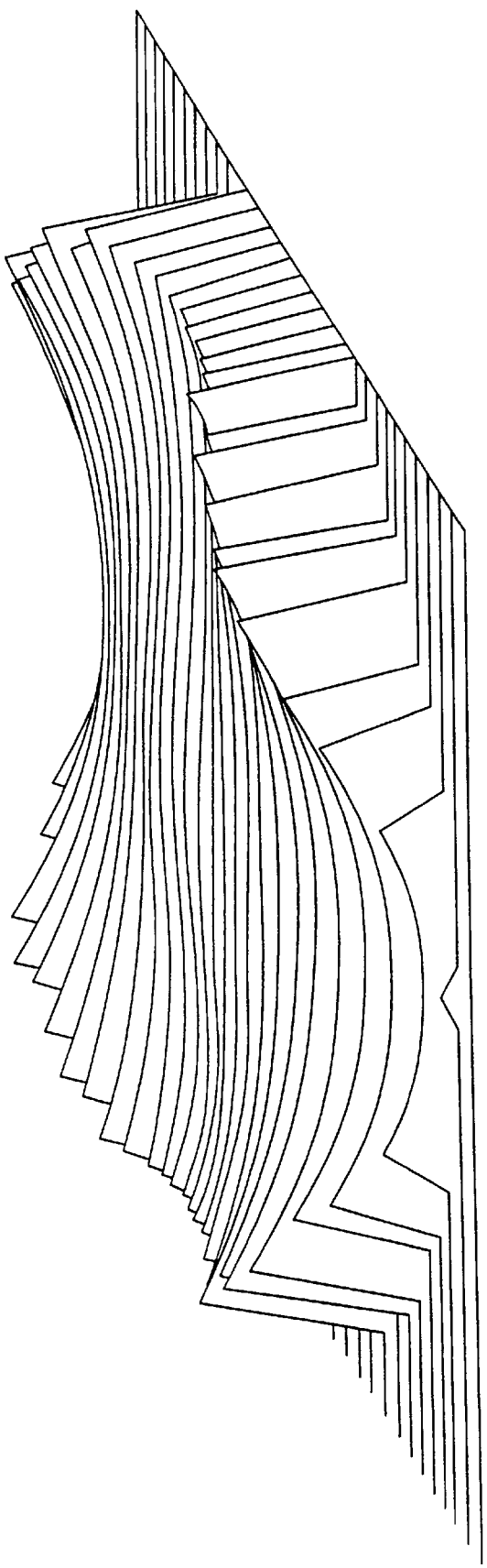

Lens 14a shapes beam 10 emitted from laser diode 12 into an output beam 10c which is circular and collimated. FIGS. 11A and 11B represent plots of wavefront error for the on-axis and off-axis field points, respectively, before a correction profile is added to the lens. The off-axis point corresponds to a 2 micron radial decentration (decentration of 1.414 microns along x and y axes). The peak-to-valley OPD is 0.190 (on-axis) and 0.210 (off-axis) waves.

Figure 12A:
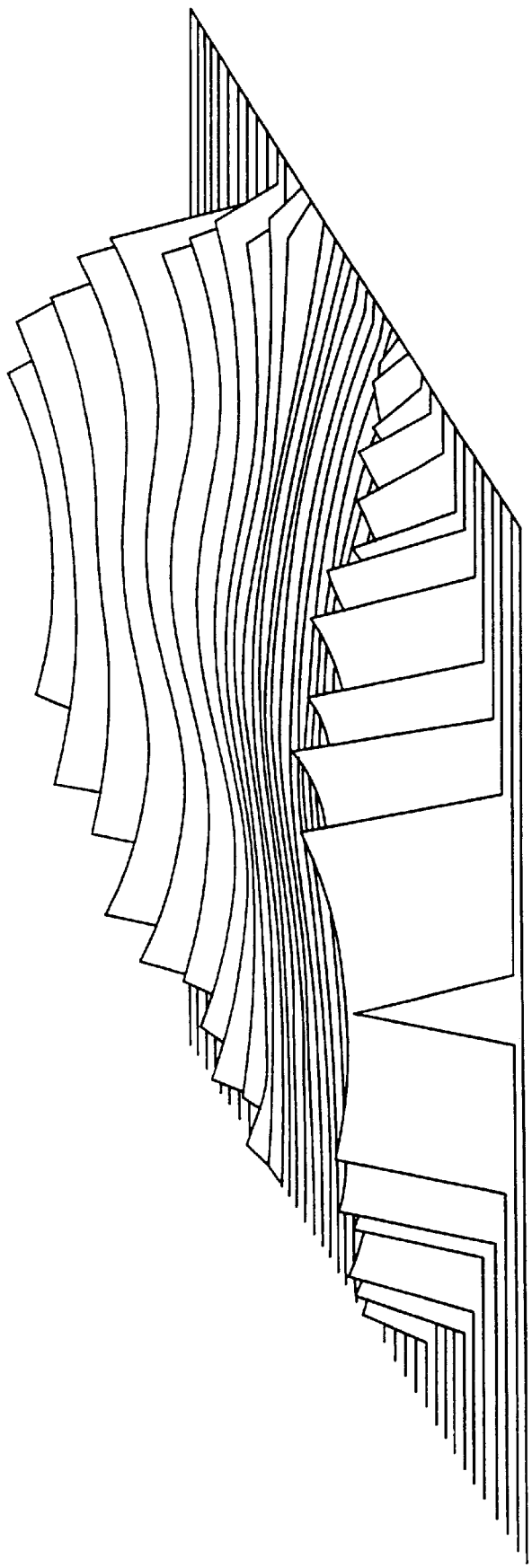
Figure 12B:
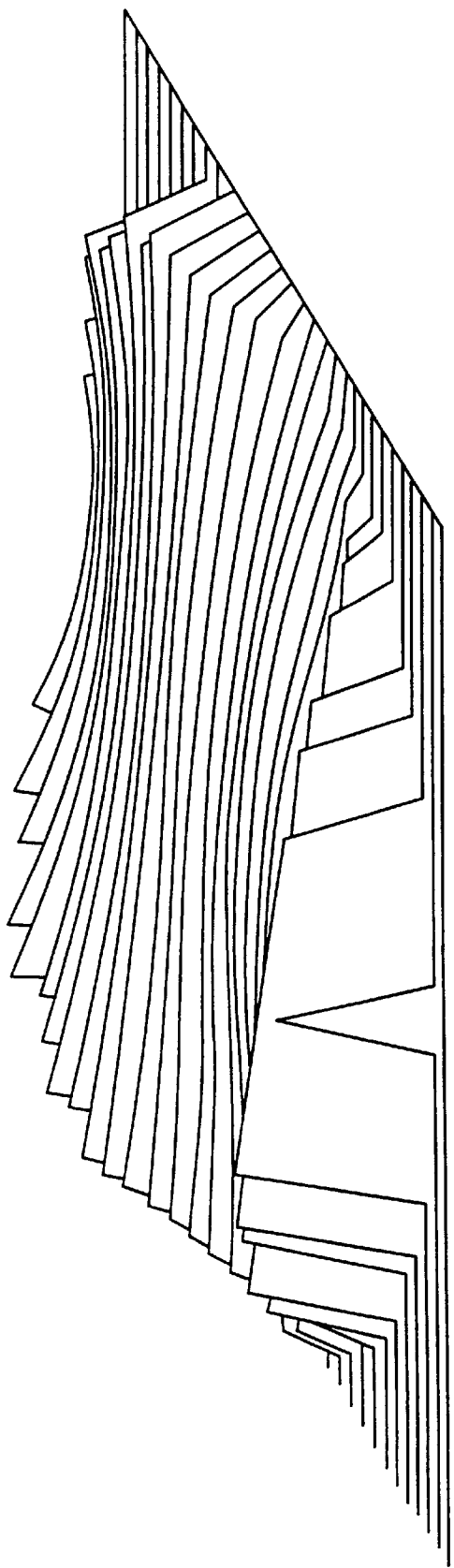

A weighted average of the OPDs shown in FIGS. 11 and 11A were best fit to a Zernike polynomial set with 36 terms. The resulting profile was converted to a sag correction profile using Equation (6). Adding this correction profile to the second surface 21 of the lens, a new set of OPD plots was obtained, as shown in FIG. 12A (on-axis) and 12B (off-axis). With the correction profile, the lens has a peak-to-valley OPD of 0.035 (on-axis) and 0.073 (off-axis) waves, a significant reduction in wavefront error.

In accordance with yet another embodiment, the lens has a single body composed of multiple elements, including, a glass substrate and two plano-convex elements, corresponding to surfaces 20 and 21, which are separated by and attached to the substrate to form the body of the lens. The laser diode may also, for example, have FWHM at 21 (tangential)×8 (sagittal) degrees, and produces a beam of wavelength 675 nm. The astigmatism of the laser diode is negligible and thus assumed to be zero. The $1/e^2$ beam diameter (diameter at which the beam intensity is equal to 0.13534 times the intensity at the center of the beam) is equal to 0.50 mm. The full (unvignetted) diameter of the output beam is equal to 0.61 mm. The thickness of the substrate, $t_1$, is equal to 4.5 mm. The maximum surface sags of the first and second surface 20 and 21, respectively, are 0.016 mm and 0.035 mm. The remainder of the lens' specifications is shown in the following table:

| $R_t$ (mm) | k | $R_s$ (mm) | t (mm) | n |
|---|---|---|---|---|
| — | — | — | 0.131 | 1.0 |
| 0.094 | −3.1651 | 0.198 | 0.020 | 1.555 |
| ∞ | 0.00 | ∞ | 4.5 | 1.514 |
| ∞ | 0.0 | ∞ | 0.030 | 1.555 |
| −1.991 | −3.6909 | −1.789 | | 1.0 |

$R_t$ and $R_s$ are the radii of curvature in the tangential and sagittal planes, respectively, k is the conic constant in the tangential plane, t is the thickness, and n is the refractive index.

Figure 13A:
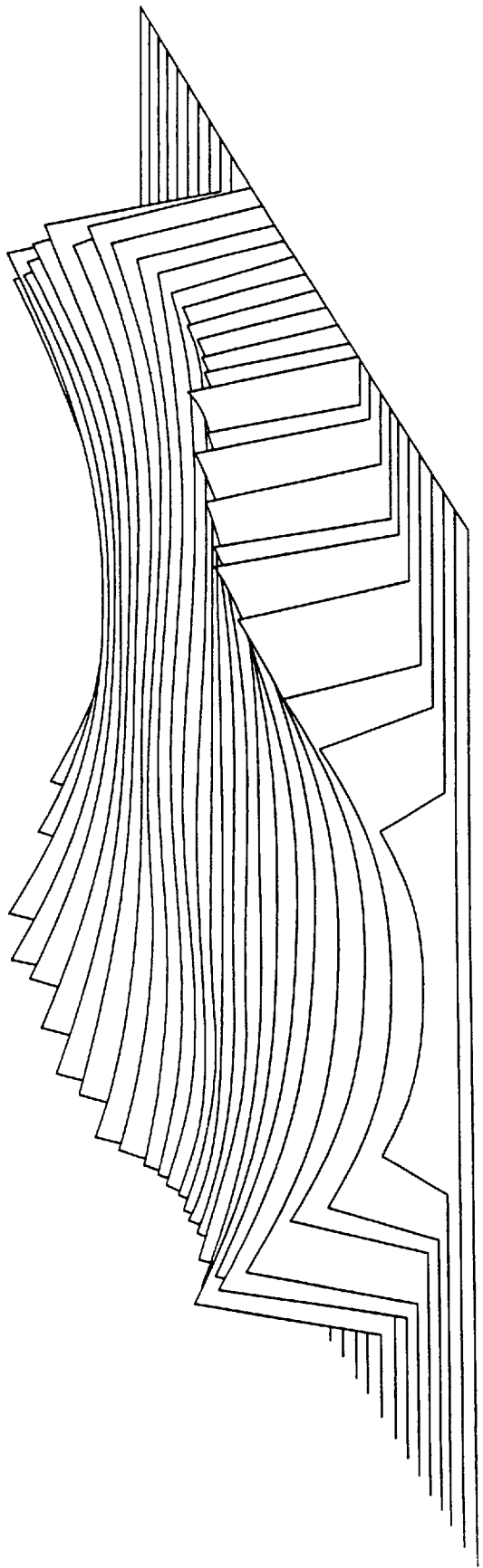
FIGS. 13A, 13B, 14A, and 14B are plots of wavefront error similar to FIGS. 8A, 8B, 9A, and 9B, respectively, in accordance with yet another embodiment of the lens.
Figure 13B:
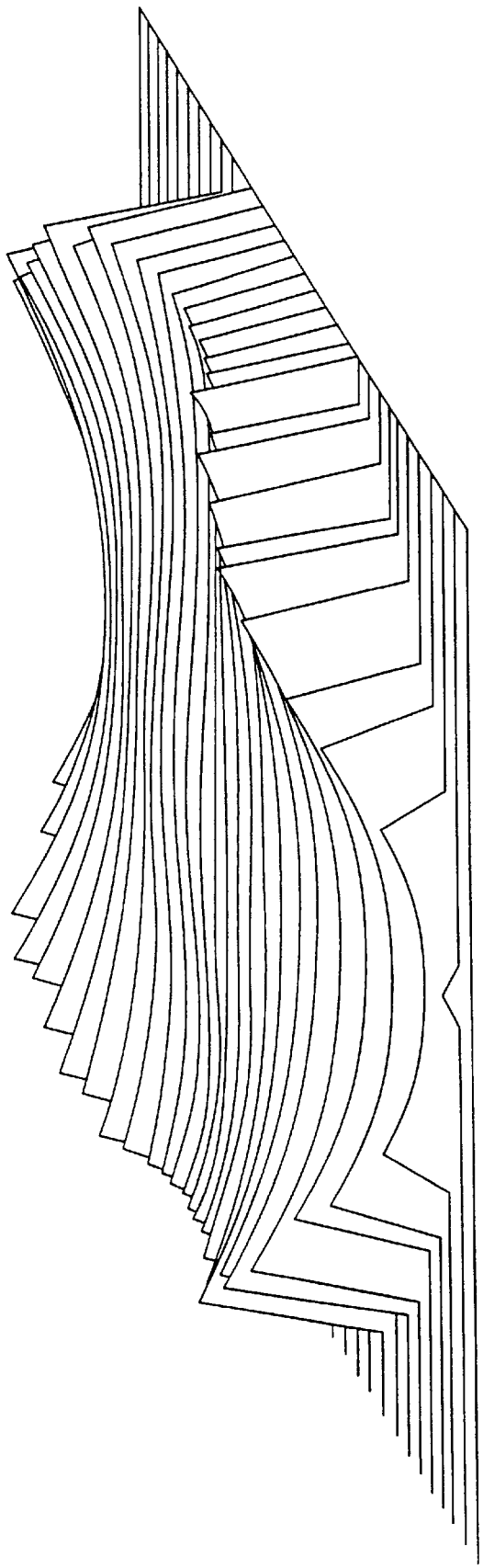

FIGS. 13A and 13B represent plots of wavefront error for on-axis and off-axis field points, respectively, before a correction profile is added to the lens. The off-axis point corresponds to a 2 micron radial decentration (decentration of 1.414 microns along x and y axes). The peak-to-valley OPD is 0.186 (on-axis) and 0.209 (off-axis) waves.

Figure 14A:
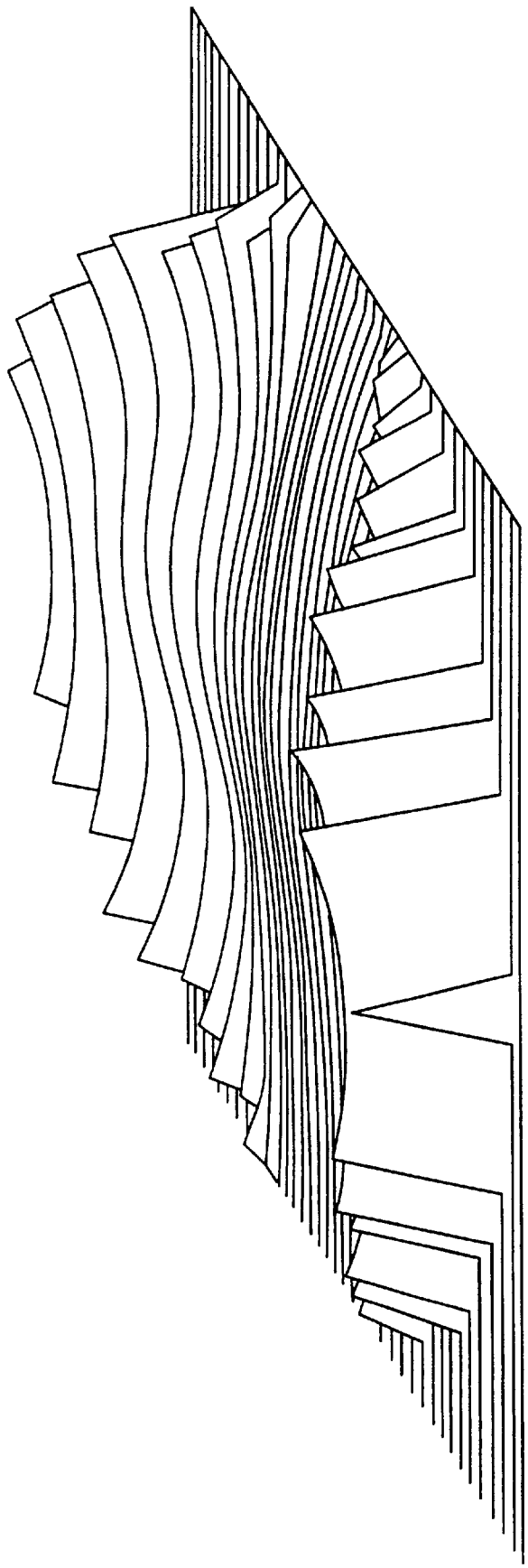
Figure 14B:
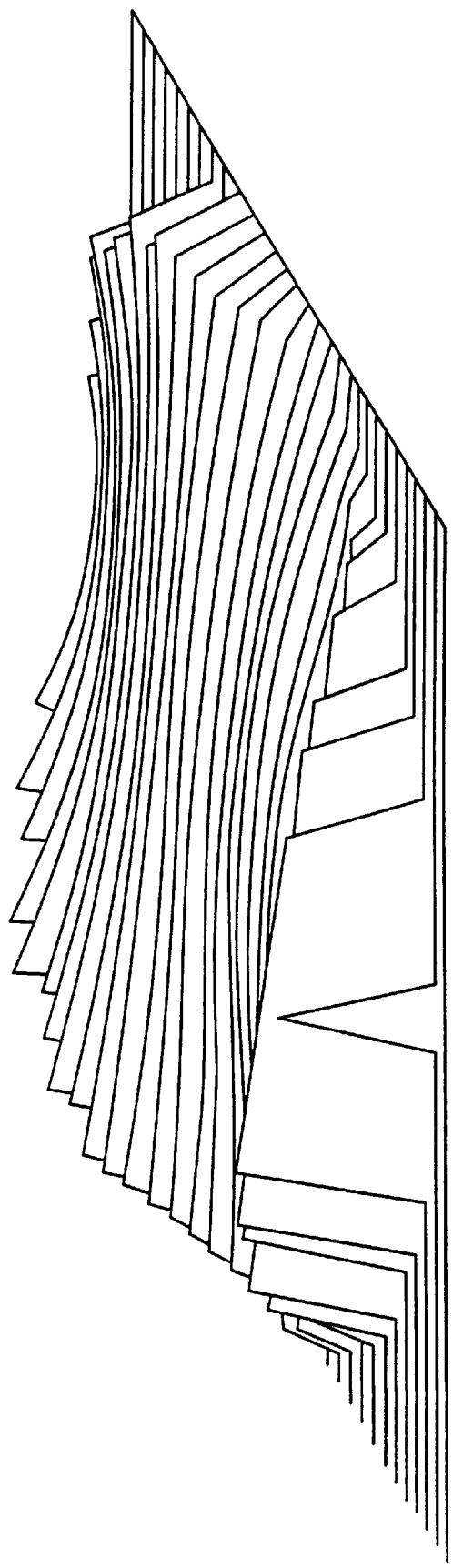

An average of OPDs shown in FIGS. 13A and 13B were best fit to a Zernike polynomial set with 36 terms. The resulting profile was converted to a sag profile using Equation (6). Adding this sag profile to the second surface 21 of the lens, and a new set of OPD plots was obtained. These plots are shown in FIGS. 14A (on-axis) and 14B (off-axis). With the correction profile, the lens has peak-to-valley OPD of 0.046 (on-axis) and 0.085 (off-axis) waves, a significant reduction in wavefront error.

In accordance with still another embodiment, a laser diode exhibiting astigmatism can also be accommodated to provide a circularized and collimated beam exiting the lens, where the lens has a single body composed of multiple elements. Such multiple elements include a glass substrate and two plano-convex elements, corresponding to surfaces 20 and 21, which are separated by and attached to the substrate to form the single body of the lens. The laser diode may, for example, have FWHM at 21 (tangential)×8 (sagittal) degrees, and produces a beam of wavelength 657 nm. The astigmatism of the diode is equal to 5 microns. This value represents the distance along the optical axis between the effective source points for the tangential and sagittal planes. The source point for the sagittal plan is located 5 microns within the laser diode. The source point for the tangential plane is located at the output facet of the laser diode. The $1/e^2$ beam diameter (diameter at which the beam intensity is equal to 0.13534 times the intensity at the center of the beam) is equal to 0.50 mm. The full (unvignetted) diameter of the output beam is equal to 0.61 mm. The thickness of the substrate, $t_1$, is equal to 4.5 mm. The sags of the first and second surfaces, respectively, are 0.016 mm and 0.035 mm. The remainder of the lens' specifications is shown in the following table:

| $R_t$ (mm) | k | $R_s$ (mm) | t (mm) | n |
|---|---|---|---|---|
| — | — | — | 0.131 | 1.0 |
| 0.094 | −3.1651 | 0.204 | 0.0159 | 1.555 |
| ∞ | 0.0 | ∞ | 4.5 | 1.514 |
| ∞ | 0.0 | ∞ | 0.0349 | 1.555 |
| −1.991 | −3.708 | −1.793 | | 1.0 |

$R_t$ and $R_s$ are the radii of curvature in the tangential and sagittal planes, respectively, k is the conic constant in the tangential plane, t is the thickness, and n is the refractive index.

Figure 15A:
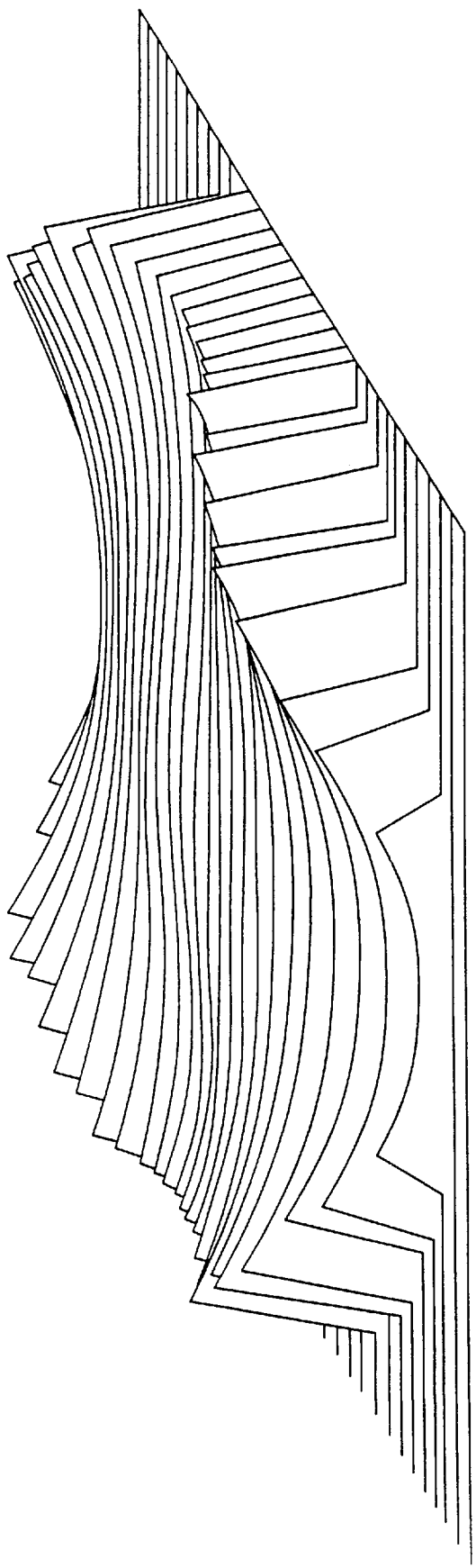
FIGS. 15A, 15B, 16A, and 16B are plots of wavefront error similar to FIGS. 8A, 8B, 9A, and 9B, respectively, in accordance with still another embodiment of the lens.
Figure 15B:
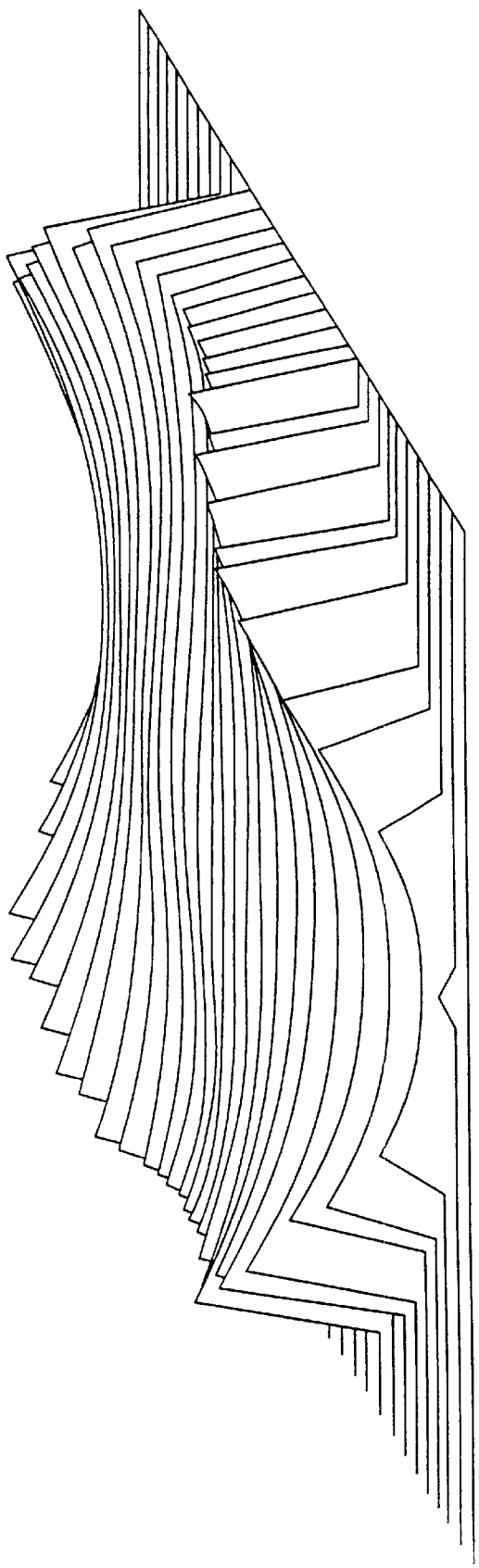

FIGS. 15A and 15B represent plots of wavefront error for on-axis and off-axis field points, respectively, before a correction profile is added to the second surface 21 of the lens. The off-axes point corresponds to a 2 micron radial decentration (decentration of 1.414 microns along x and y axes). The peak-to-valley OPD is 0.189 (on-axis) and 0.212 (off-axis) waves.

Figure 16A:
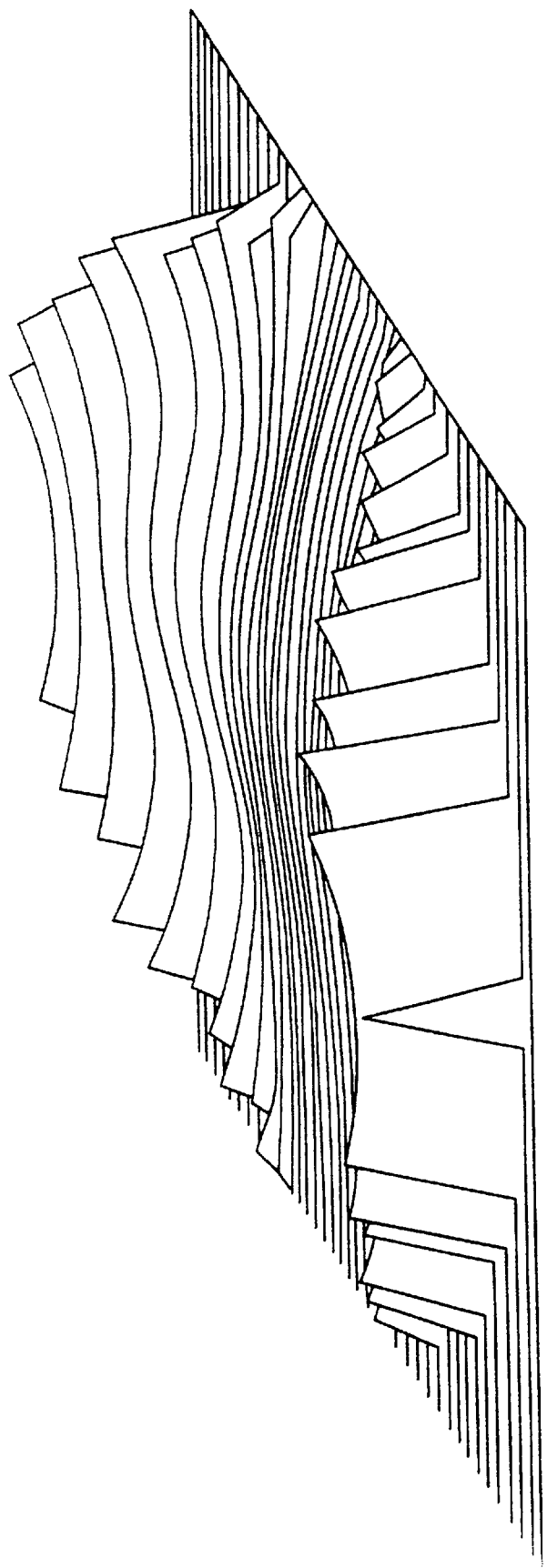
Figure 16B:
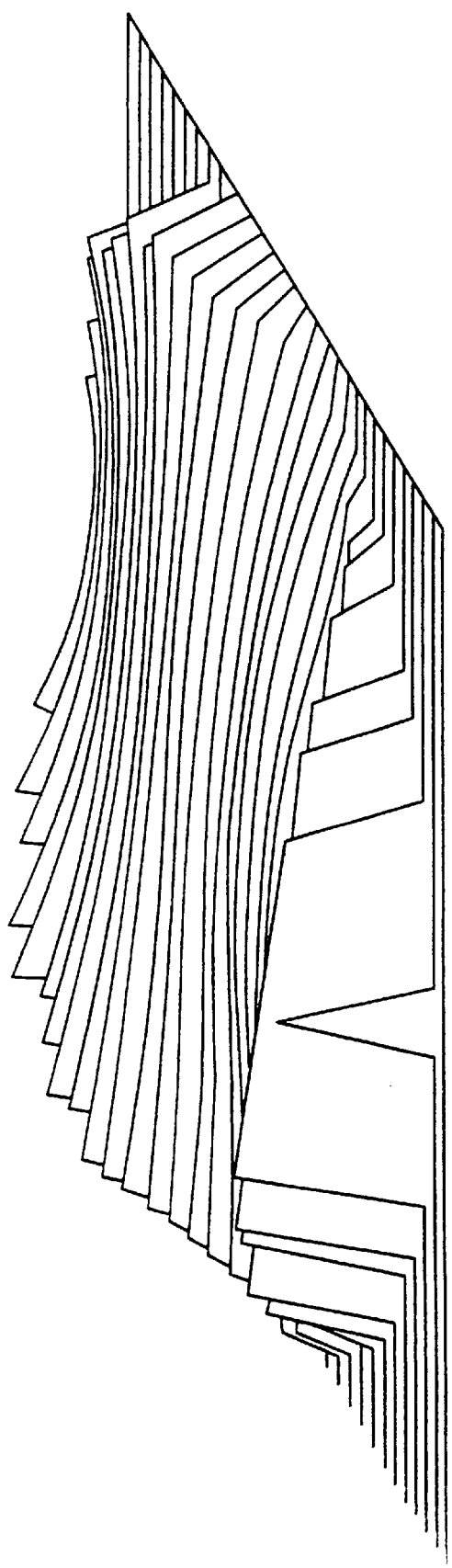

An average of OPDs shown in FIGS. 15A and 15B were best fit to a Zernike polynomial set with 36 terms. The resulting profile was converted to a correction profile using Equation (6). Adding this sag profile to the second surface, a new set of OPD plots was obtained. These plots are shown in FIGS. 16A (on-axis) and 16B (off-axis). With the correction profile, the lens has peak-to-valley OPD of 0.046 (on-axis) and 0.084 (off-axis) waves, a significant reduction in wavefront error.

As demonstrated by the above embodiments, a significant reduction is wavefront error is provided by the correction profile of lens 14. This increases the misalignment tolerances of the laser diode to the lens since even though the laser diode is placed off-axis the lens, the wavefront error in the shaped beam is maintained within an acceptable level, thereby performance of the lens in shaping the laser diode beam is not significantly impacted by misalignment within these expanded tolerances. In addition to the increased misalignment tolerances, the correction profile reduces the wavefront error in the beam for subsequent optical processing. Moreover, the correction profile may allow the body 16 of the lens to be thinner, as compared to prior art single beam shaping lenses, such as described in U.S. Pat. No. 4,915,484.

Further, the use of 2 micron decentration of the laser diode from the optical axis of the lens in the above embodiments is exemplary of the present invention. Reduction in wavefront error by the correction profile may also be achieved to account for other amounts of decentration, such as 10 microns off-axis the lens.

Figure 17:
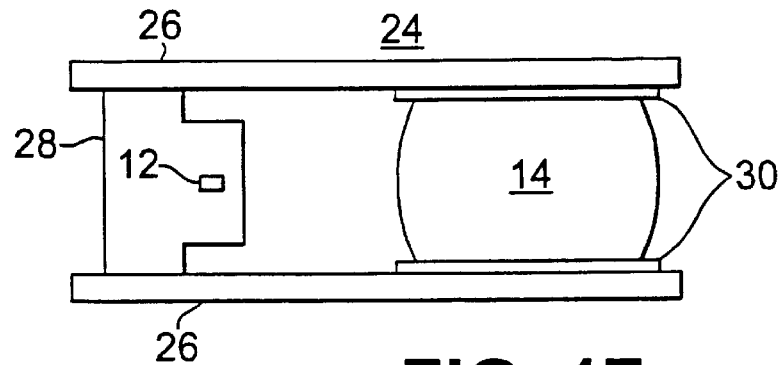
FIG. 17 is a block diagram showing an example of a laser diode assembly with the lens of the present invention.

Lens 14 may be part of an optical system (which may include a laser diode), or part of a laser diode assembly. For example, the lens can be attached directly to the housing or package of a laser diode, and thus act as a protective covering for the laser diode. This may eliminate the need for an additional window, typically used to protect laser diodes, or the lens 14 may replace this window. Lens 14 may also be part of a laser diode assembly 24 such as shown, for example, in FIG. 17. Assembly 24 has a housing 26, such as a hollow tube, and a laser diode package 28 mounted at one end of the housing with laser diode 12. At the other end of the housing is mounted lens 14. Lens 14 may be contained in a sleeve 30 to facilitate mounting in housing 26. Housing 26 may be a conventional collimator tube typically used to support a collimator lens in relation to a laser diode.

Figure 18:
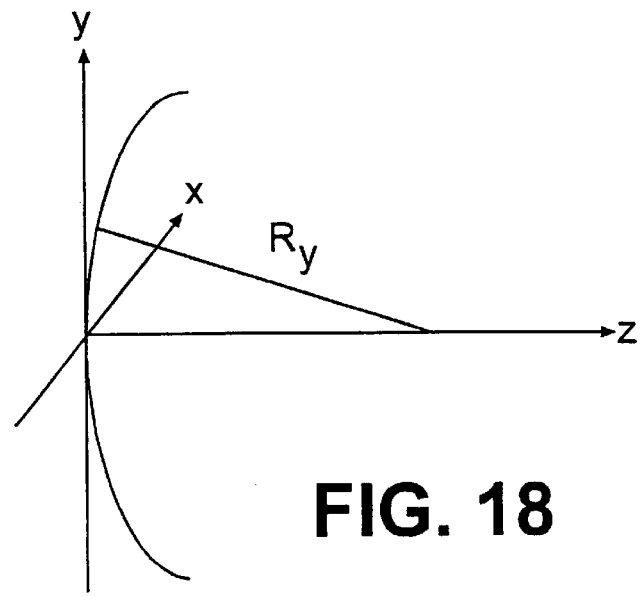
FIG. 18 is a view showing the coordinate system of the lens shown in FIGS. 19(a)–(c) and 20(a)–(c)
Figure 19I:
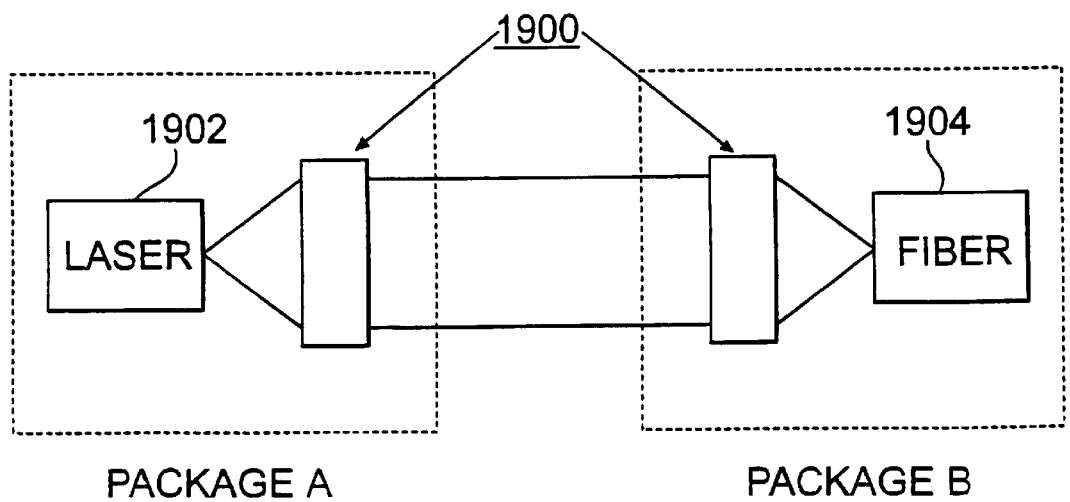
FIG. 19(i) is a schematic diagram which shows a coupling system including the source end and image end of a lens as in FIG. 19(a) which couples a source to an optical fiber.
Figure 19C:
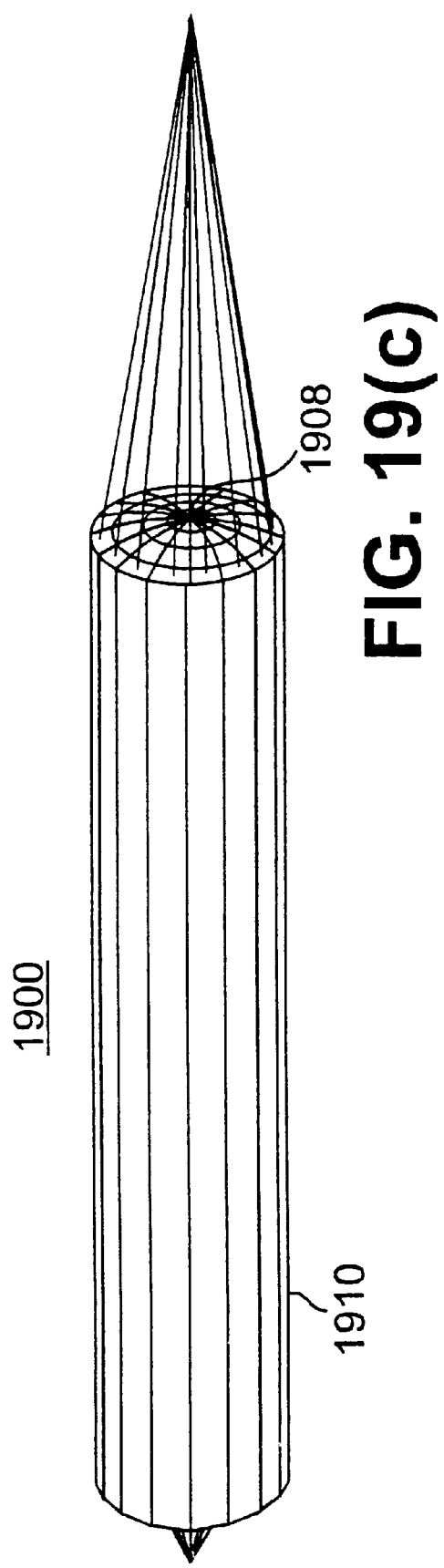
FIG. 19(c) is a three-dimensional or perspective view of the lens of FIG. 19(a), but from the image side (where an end of an optical fiber into which the converged beam is launched is located), the virtual or construction lines being for the same purpose as in FIG. 19(b)
Figure 19D:
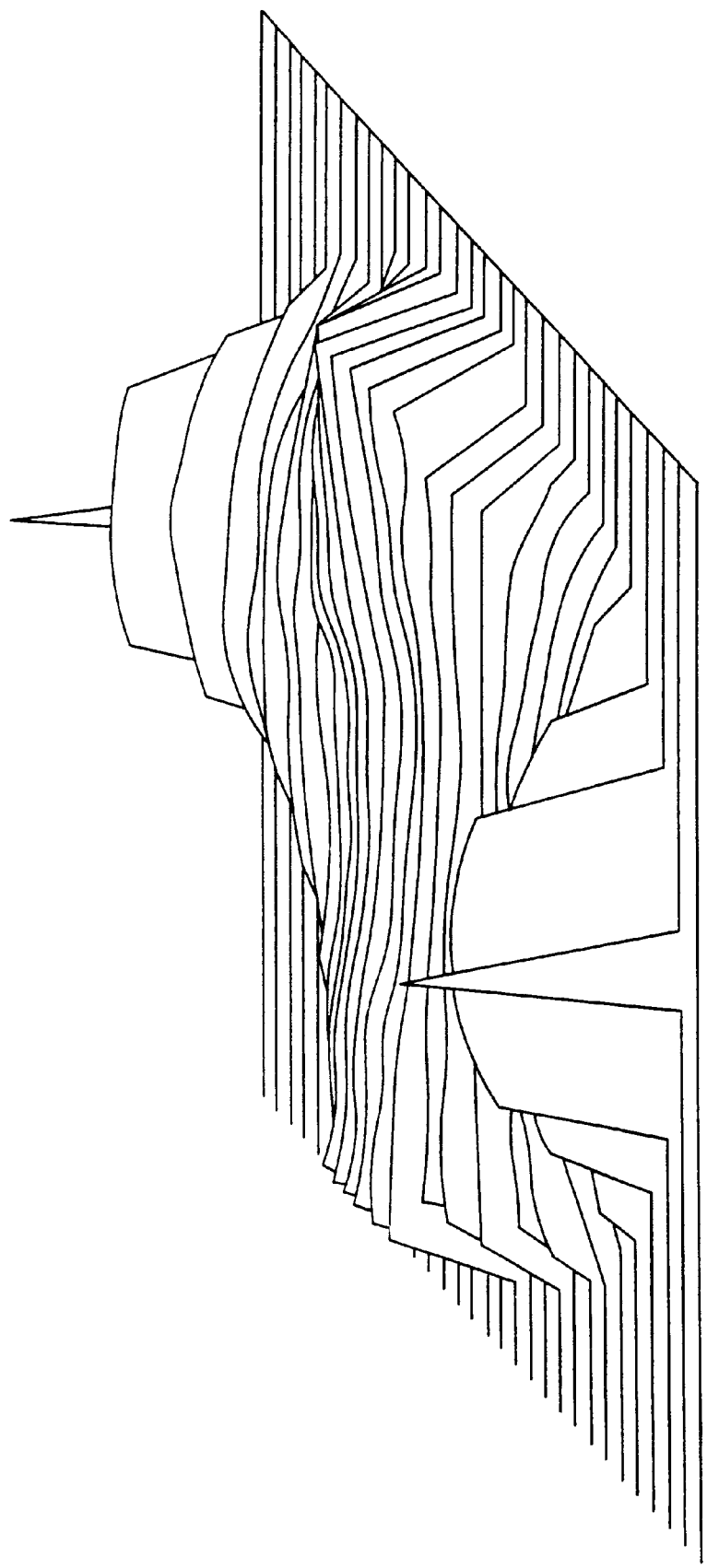
FIGS. 19(d) and 19(e) are views similar to FIGS. 8A and 8B, respectively, for the lens of FIG. 19(a)
Figure 19E:
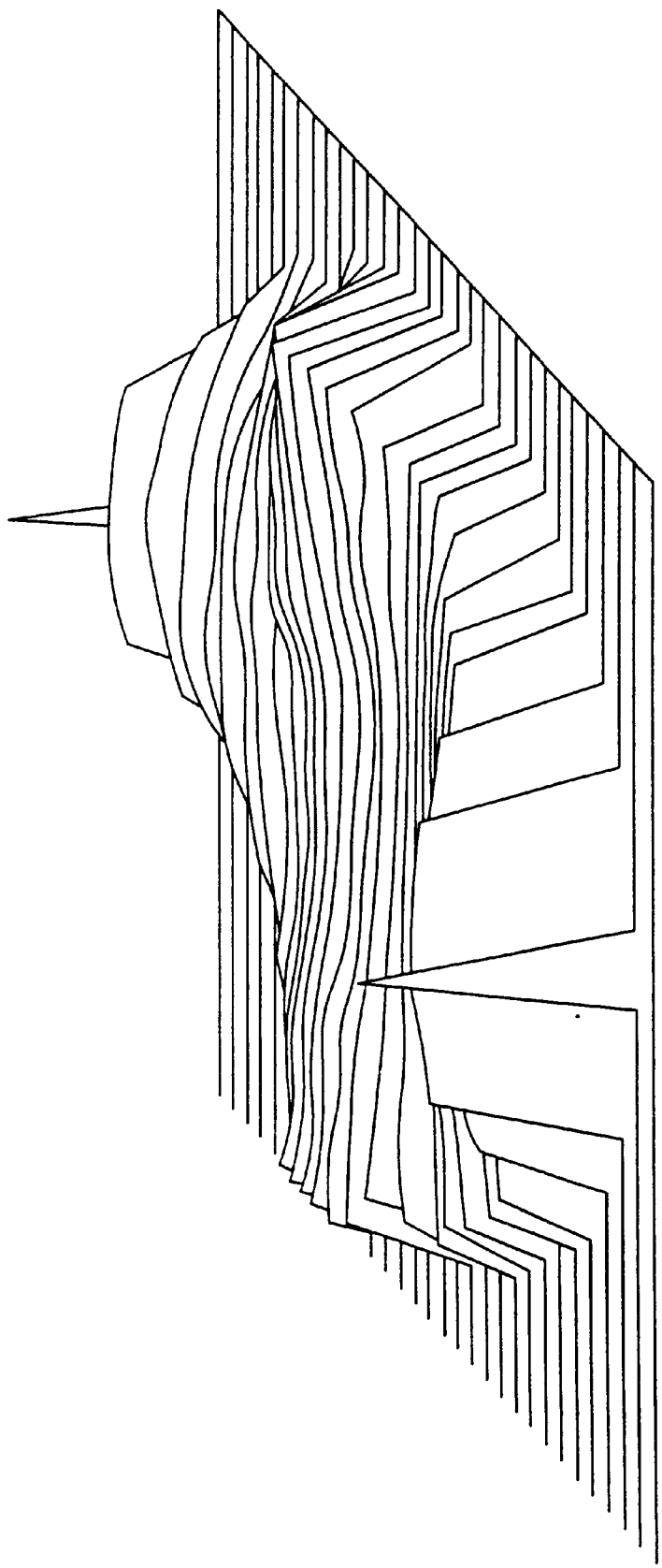
Figure 19F:
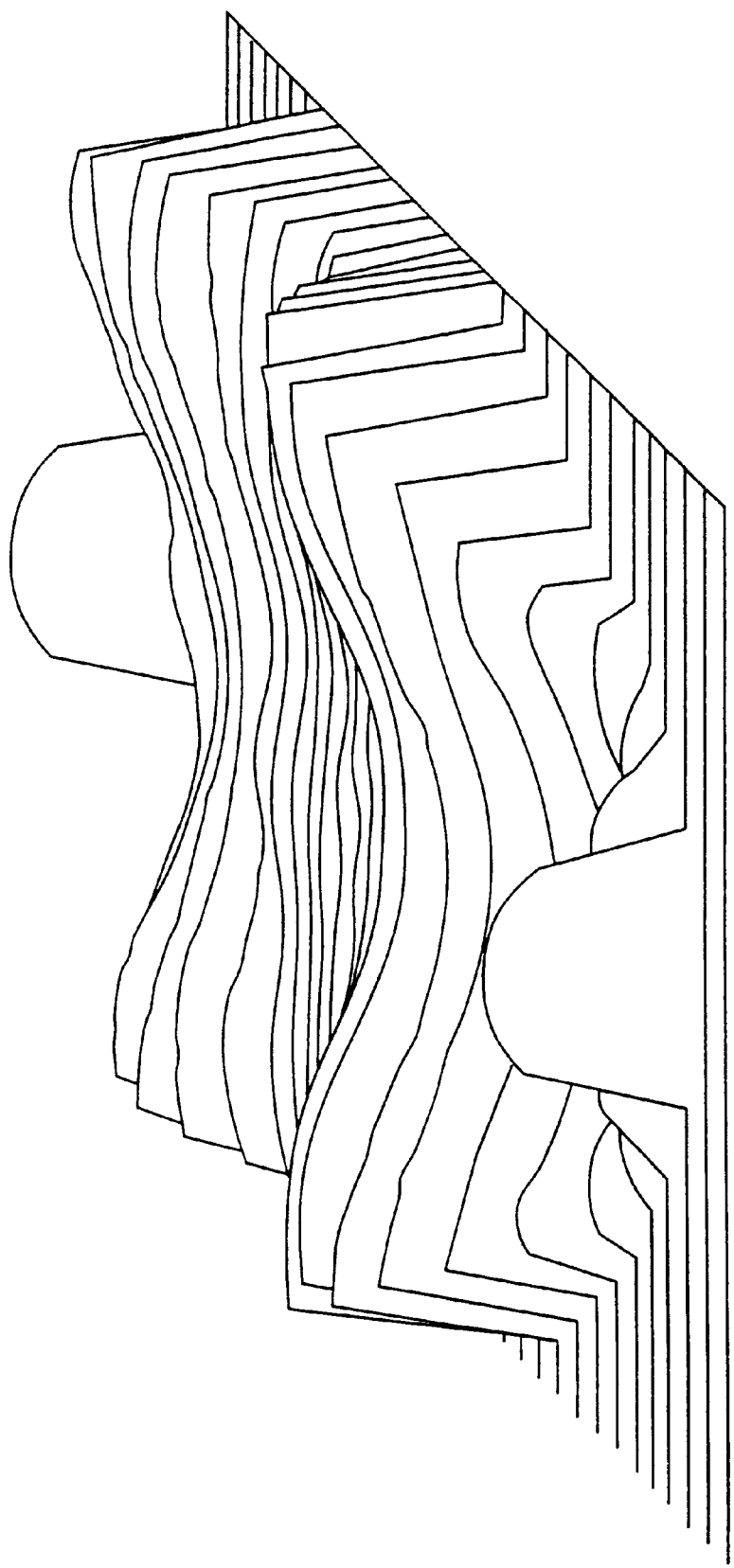
FIGS. 19(f) and 19(g) are views similar to FIGS. 9A and 9B, respectively, for the lens of FIG. 19(a)
Figure 19G:
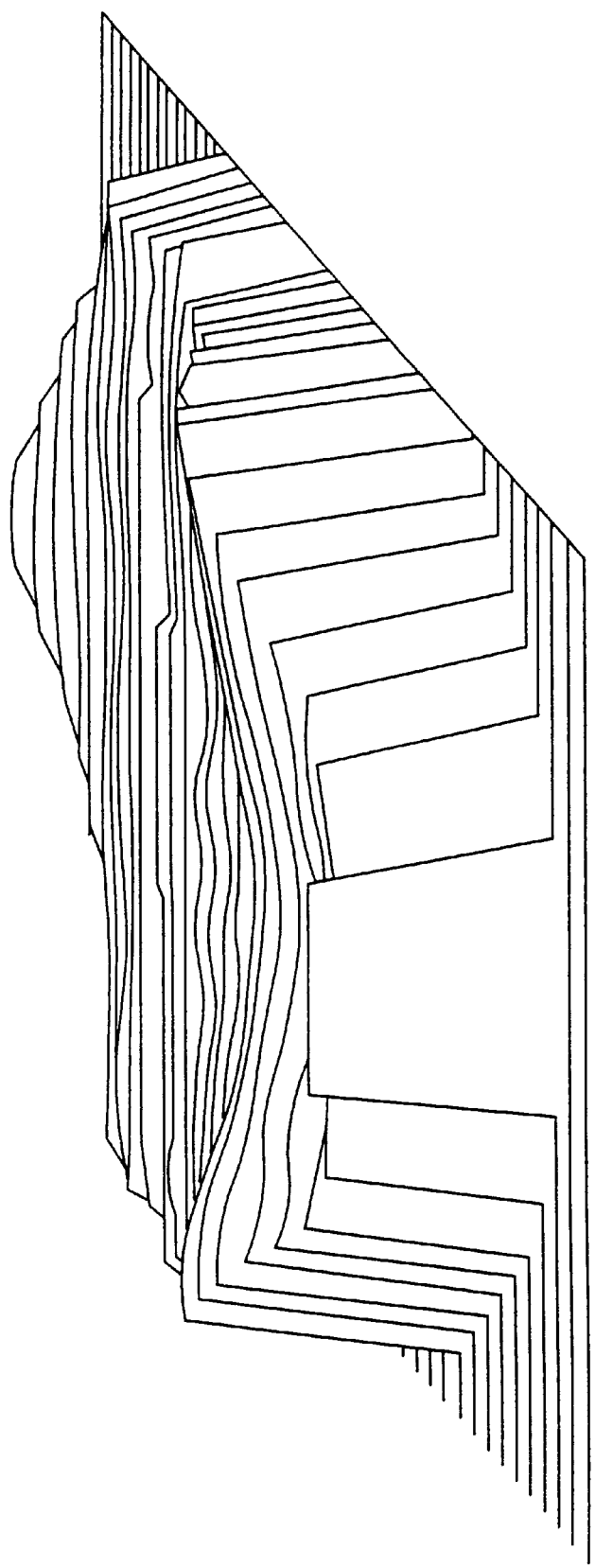
Figure 19H:
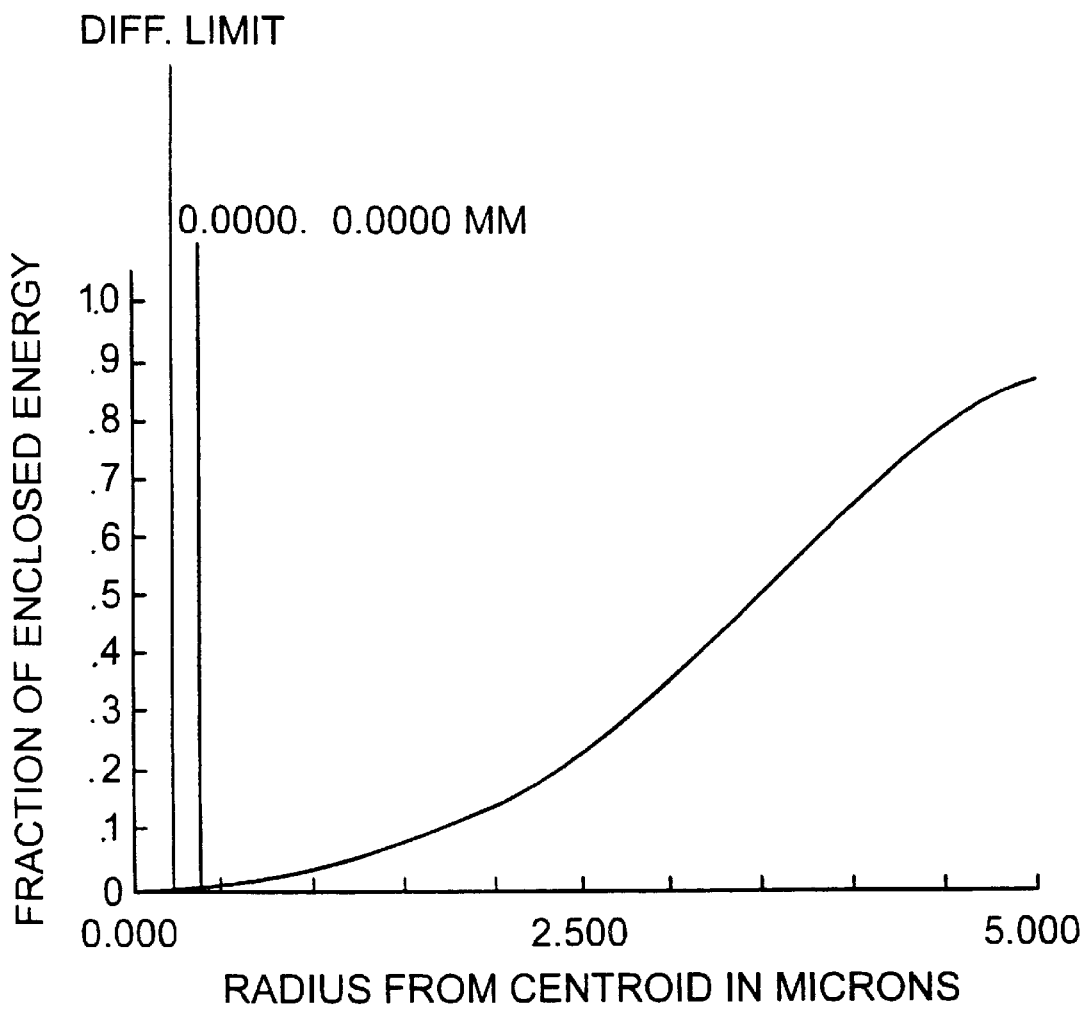
FIG. 19(h) is a curve showing the encircled optical energy distribution produced by the lens of FIG. 19(a) in the image plane.
Figure 20A:
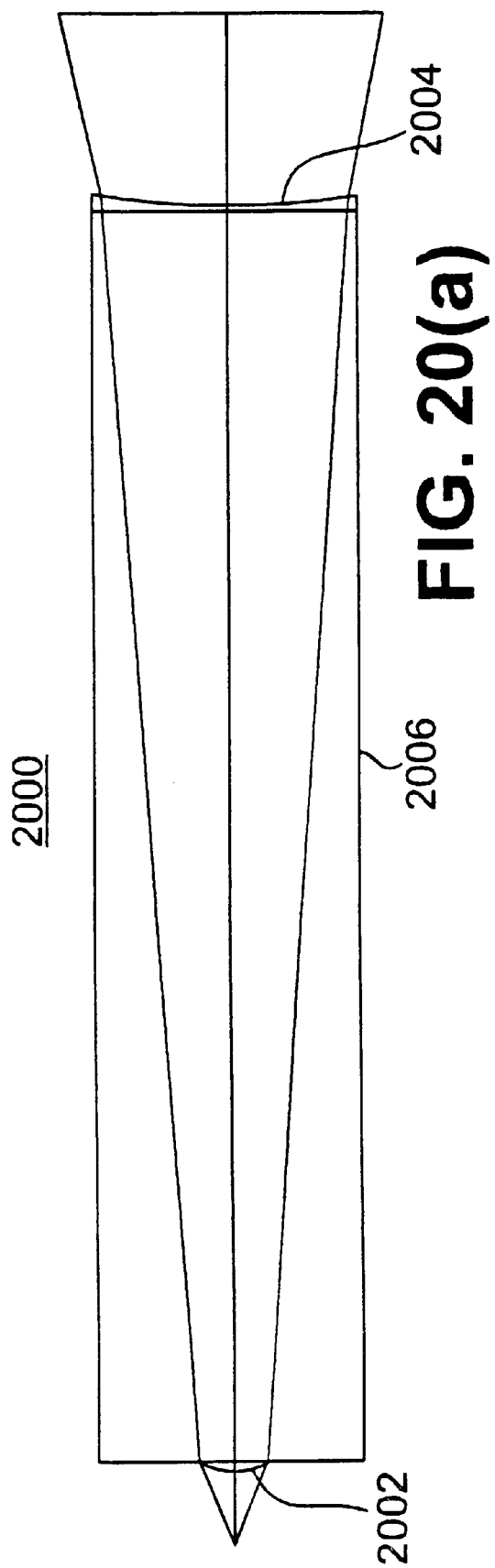
FIG. 20(a) is a schematic diagram similar to FIG. 2A showing, in the tangential (y-z) plane, a lens for circularizing and diverging a beam from a diode laser source in accordance with still another embodiment of the invention.
Figure 20B:
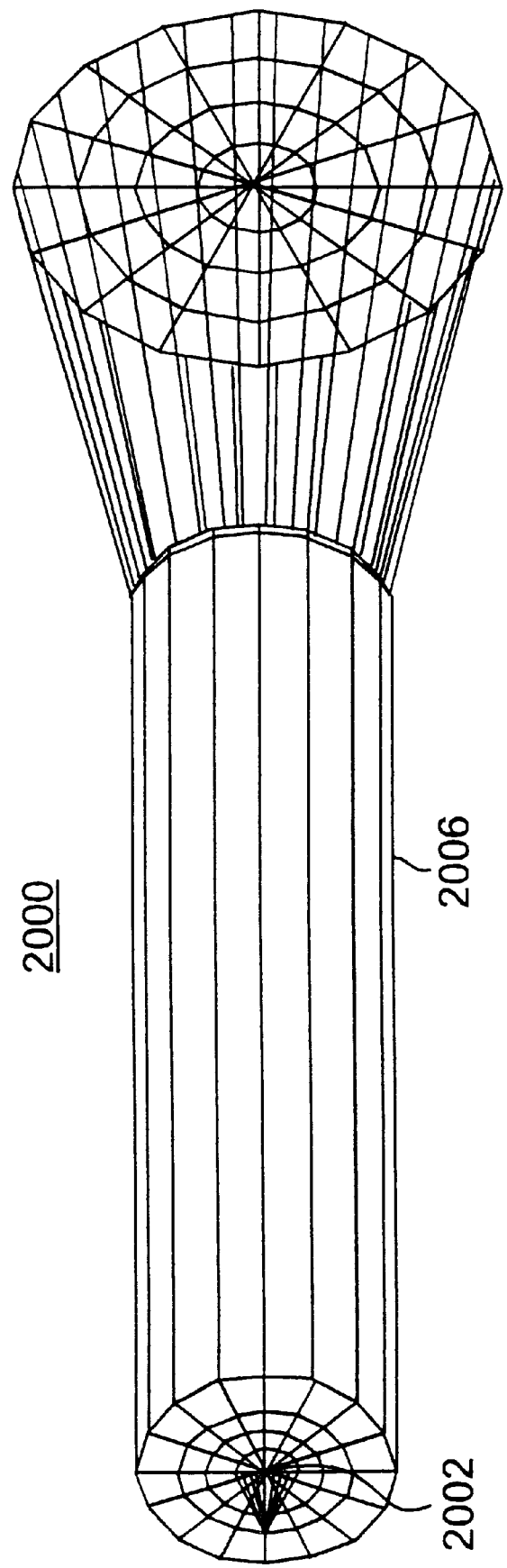
FIG. 20(b) is a view similar to FIG. 19(b) but for the lens of FIG. 20(a)
Figure 20D:
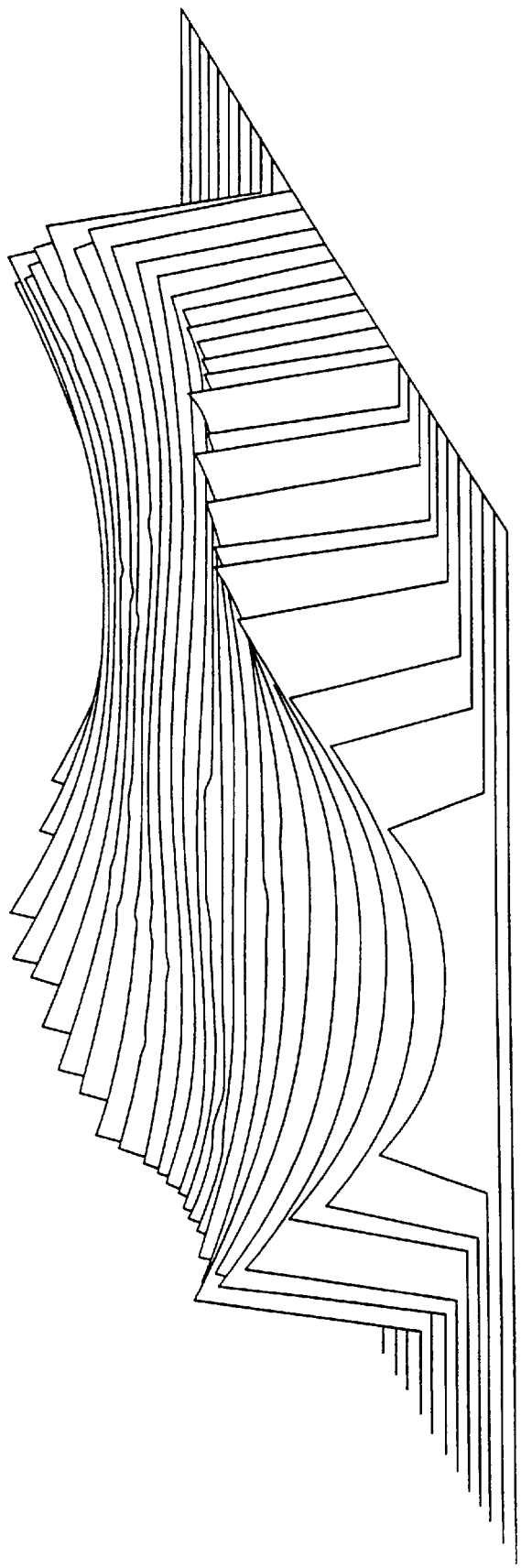
FIGS. 20(d), 20(e), 20(f) and 20(g) are views similar to FIGS. 19(d), 19(e), 19(f) and 19(g) respectively but for the lens of FIG. 20(a).
Figure 20E:
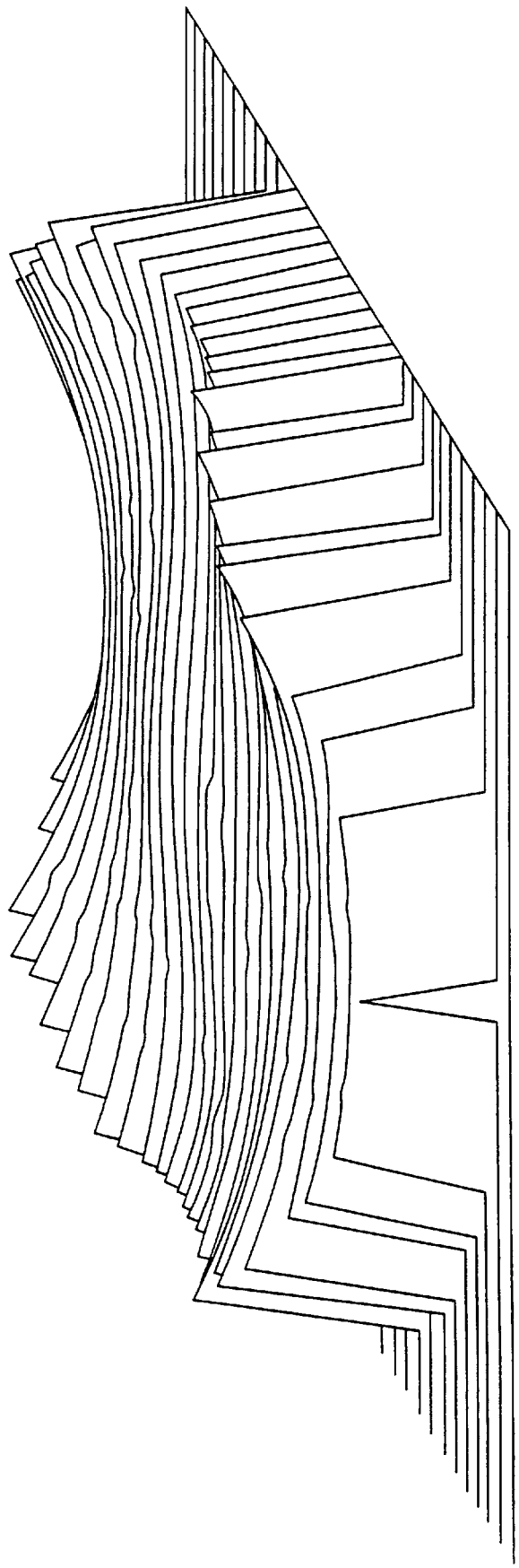
Figure 20F:
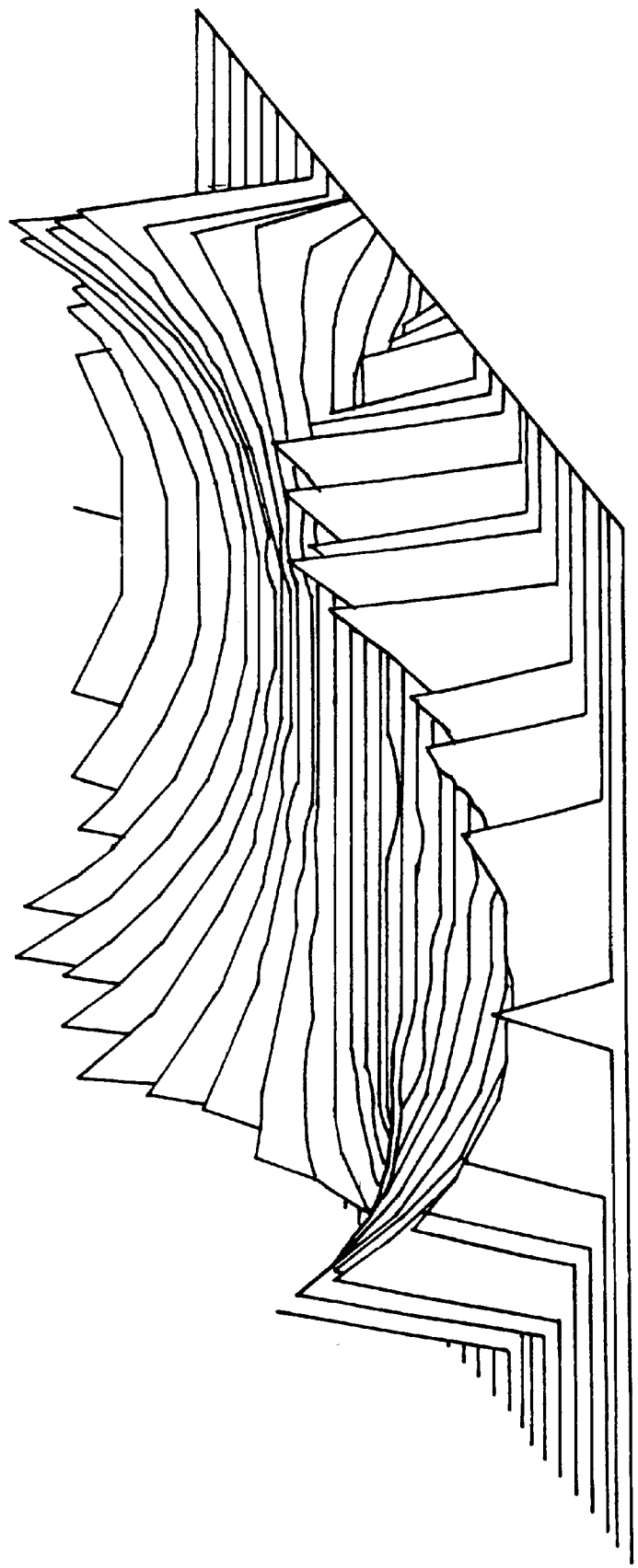
Figure 20G:
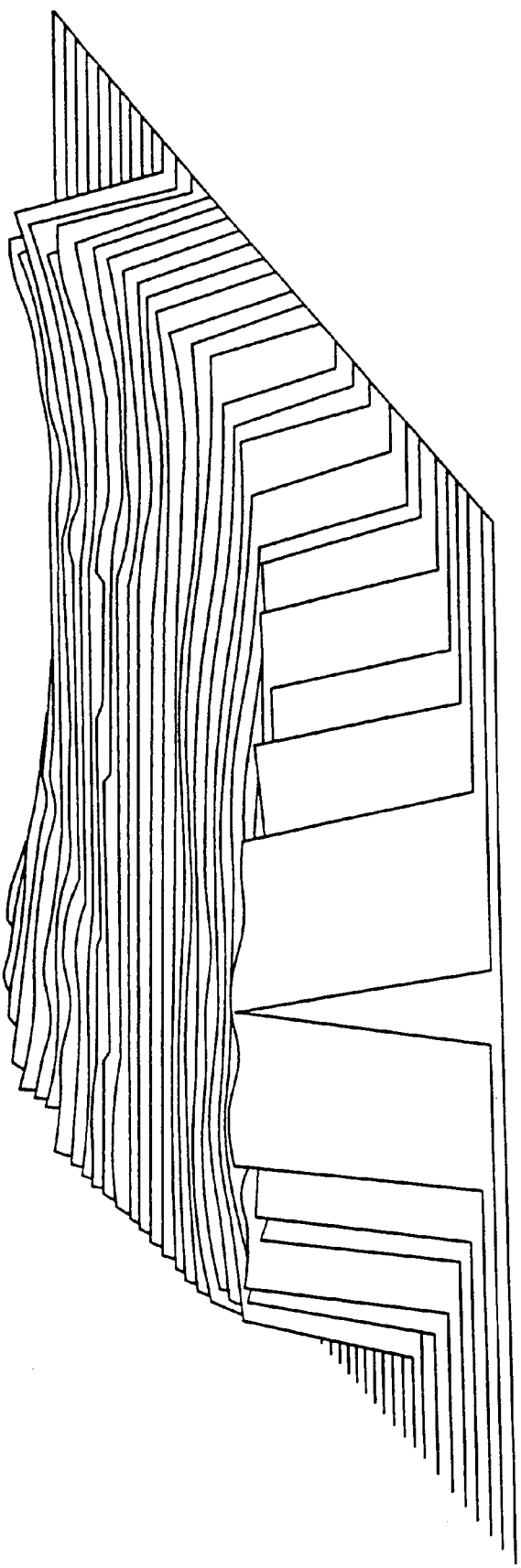

Referring to FIGS. 18 and 19(*a*)–(*i*) a monolithic, anamorphic lens 1900 which can be used to focus (converge) a non-symmetrical laser beam, such as that produced by a semiconductor laser 1902. An important application of this lens is fiber coupling, see FIG. 19(*i*). In this usage the lens collects radiation emitted by the laser diode 1902 and forms a circular spot at the entrance surface of an optical fiber 1904 to couple the radiation into the fiber. This lens has the following advantages over existing fiber coupling lenses:

1. Greatly increased optical throughput;
2. Reduced wavefront error resulting in higher coupling efficiency into the fiber;
3. Improved alignment tolerances.

Existing diode-to-fiber coupling lenses provide coupling efficiencies of approximately 50–60%. The loss is primarily due to two factors. First, the lenses typically collect only a limited amount of the radiation emitted by the diode and second, they provide only poor to moderate imaging performance in terms of wavefront error. This design addresses both of these issues. The lens is placed in close proximity to the diode to enable collection of greater than 80% of the emitted radiation. The surfaces are defined to provide excellent wavefront quality of the exiting beam. This includes a corrector profile added to one or both of the surfaces. This corrector profile is best described in terms of Zernike polynomials. This design is based on the use of fabrication technology for producing deep-sag, anamorphic lens surfaces (high numerical aperture (NA)). Single-point laser pattern generation is ideally suited to this application.

The coupling lens 1900 configuration is that of two plano-convex elements 1906 and 1908 separated by and attached to a glass substrate 1910. The diode has a FHWM specification of 26.5 (tangential)×5.3 (sagittal) degrees. The wavelength is 1.55 microns. The astigmatism of the diode is negligible and thus assumed to be zero (although the case of non-zero astigmatism is readily handled). The truncation ratio of this lens is 1.3 where truncation ratio is defined as the diameter of the clear aperture (located at last lens surface) divided by the diameter of the $1/e^2$ point of the Gaussian intensity profile. With this truncation ratio, the percentage of light collected by the lens is approximately 97%. The thickness of the substrate, $t_1$, is equal to 1.094 mm. The sags of the first and second surfaces are 0.021 mm and 0.020 mm, respectively. The remainder of the optical design specification is given in the following table. This lens is designed to couple radiation into a single-mode fiber with a 10-micron fiber core.

TABLE

Lens prescription for exemplary diode-fiber coupler lens 1900

| $R_t$ (mm) | $k_t$ | $R_s$ (mm) | $k_s$ | t (mm) | n |
|---|---|---|---|---|---|
| — | — | — | — | 0.075 | 1.0 |
| 0.0553 | −2.6985 | ∞ | — | 0.021 | 1.608 |
| ∞ | 0.0 | ∞ | — | 1.094 | 1.5 |
| ∞ | 0.0 | ∞ | — | 0.020 | 1.608 |
| −0.2348 | −3.0582 | −0.2035 | −1.5198 | 0.572 | 1.0 |

$R_t$ and $R_s$ are the radii of curvature in the tangential (y-z) and sagittal (x-z) planes, respectively, $k_t$ and $k_s$ are the conic constants in the tangential and sagittal planes, respectively, t is the thickness, and n is the refractive index. These quantities are defined using standard lens design conventions. The coordinate system is shown in FIG. 18.

FIG. 19(*a*) shows the basic layout of this design in the tangential meridian (plane). FIG. 19(*b*) shows a three-dimensional view of the lens from the diode side. FIG. 19(*c*) shows a three-dimensional view of the lens from the image (or fiber) side. The beam entering the lens is diverging and has an elliptical cross-sectional intensity profile. The beam exiting the lens is converging towards the face of the optical fiber and has a circular cross-sectional intensity profile.

FIGS. 19(*d*) and 19 (*e*) show plots of the OPD error for the on and off-axis field points, respectively, before a correction profile is added to the lens. The off-axis point corresponds to a 2 micron radial decentration (decentration of 1.414 microns along the x and y axes). The peak-to-valley OPD error is 0.16 (on-axis) and 0.244 (off-axis) waves.

The OPD shown in FIG. 19(*b*) was fit to a set of Zernike polynomials with 36 terms. The resulting profile was converted to a sag correction profile. Adding this correction profile to the second surface of the lens, a new set of OPD plots was obtained, as shown in FIGS. 19(*f*) (on-axis) and 19(*g*) (off-axis). With this correction profile, the lens has a peak-to-valley OPD of 0.027 (on-axis) and 0.094 (off-axis) waves, a significant reduction in wavefront error.

FIG. 19(*h*) shows a plot of encircled energy at the image plane. The y-axis corresponds to the percentage of radiation at the image plane that is contained within a circle of semi-diameter given by the values on the x-axis. The plot indicates that approximately 87% of the radiation is contained within a 10 micron diameter. This is roughly ideal for a single-mode fiber with a core diameter of 10 microns and enables roughly 100% coupling efficiency into the fiber.

Given that the lens collects approximately 97% of the light emitted by laser diode, the overall coupling efficiency from the diode into the fiber is estimated to be greater than 95%. This does not include Fresnel reflection losses at the lens surfaces. The surfaces can be coated to remove these losses.

Compared to the 50–60% coupling efficiencies of designs heretofore in use, this new lens represents a significant improvement.

FIG. 19(*i*) shows the basic layout of a coupler system using such a lens. In this configuration the first lens forms a collimated beam and the second lens focuses the beam down into a fiber. This allows placement of additional optical components between the two lenses. These additional optical components could be filters or amplifiers, for example. The system can also be viewed as being composed of two subsystems, Package A and Package B, that are linked together. By providing a collimated beam between the two lenses, alignment of the packages is insensitive to lateral shifts relative to each other. The only losses would be due to vignetting.

Referring to FIGS. 18 and 20 (*a*)–(*i*), a monolithic, anamorphic lens 2000 is shown which can be used to form a circularized and well-corrected diverging beam from a non-symmetrical laser beam, such as that produced by a semiconductor laser. It is well known that the beam emitted from a laser diode is typically elliptical in cross-sectional intensity, astigmatic, and diverging. These features are usually undesirable from an imaging point of view. Using this lens, one can produce a diverging beam that is well corrected in terms of wavefront error and free of astigmatism. The resulting diverging beam may serve as a source for any optical system that requires a well corrected laser beam. In practice, one might use a secondary lens to change the divergence so that the beam diverges or converges at a different cone angle or is collimated. Since our lens is located close to the output plane of the diode, it can collect greater than 90% of the light emitted. Advantages of this design over existing methods for producing a diverging beam from a laser diode include:

1. Greatly increased optical throughput;
2. Reduced wavefront error;
3. Improved alignment tolerances.

The surfaces are defined to provide excellent wavefront quality of the exiting beam. This includes a corrector profile added to one or both of the surfaces. This corrector profile is best described in terms of Zernike polynomials. This design is based on the use of fabrication technology for producing deep-sag, anamorphic lens surfaces (high numerical aperture (NA)) Single-point laser pattern generation is ideally suited to this application.

The lens is on a plano-convex element 2002 and a plano-concave element 2004 separated by and attached to a glass substrate 2006. The diode has a FWHM specification of 22 tangential)×9 (sagittal) degrees. The wavelength is 0.66 microns. The astigmatism of the diode is 5 microns.

The truncation ratio of this lens is 1.2 where truncation ratio is defined as the diameter of the clear aperture (located at last lens surface) divided by the diameter of the 1/e² point of the Gaussian intensity profile. With this truncation ratio, the percentage of light collected by the lens is approximately 94%. The thickness of the substrate, to, is equal to 2.0 mm. The sags of the first and second surfaces are 0.016 mm and 0.020 mm, respectively. The output beam divergence angle for the marginal at the edge of the clear aperture is 11.5 degrees. The remainder of the optical design specification is given in the following table.

TABLE

Lens prescription for exemplary circularizer/diverger lens 2000

| $R_t$ (mm) | $k_t$ | $R_s$ (mm) | $k_s$ | t (mm) | n |
|---|---|---|---|---|---|
| — | — | — | — | 0.075 | 1.0 |
| 0.0988 | −3.7266 | ∞ | — | .016 | 1.555 |
| ∞ | 0.0 | ∞ | — | 2.0 | 1.514 |
| ∞ | 0.0 | ∞ | — | 0.002 | 1.555 |
| 1.224 | −6.76155 | 1.678 | −16.235 | — | 1.0 |

$R_t$ and $R_s$ are the radii of curvature in the tangential (y-z) and sagittal (x-z) planes, respectively, $k_t$ and $k_s$ are the conic constants in the tangential and sagittal planes, respectively, t is the thickness, and n is the refractive index. These quantities are defined using standard lens design conventions. The coordinate system is shown in FIG. 18.

FIG. 20(*a*) shows the basic layout of this lens 2000 in the tangential meridian (plane). FIG. 20(*b*) shows a three-dimensional view of the lens from the diode side. FIG. 20(*c*) shows a three-dimensional view of the lens from the exit side. The beam entering the lens 2000 is diverging and has an elliptical cross-sectional intensity profile. The beam exiting the lens is diverging with a spherical wavefront and has a circular cross-sectional intensity profile.

FIGS. 20(*d*) and 20 (*e*) show plots of the OPD error for the on and off-axis field points, before a correction profile is added to the lens. The off-axis point corresponds to a 2 micron radial decentration (decentration of 1.414 microns along the x and y axes). The peak-to-valley OPD error is 0.119 (on-axis) and 0.224 (off-axis) waves.

The OPD shown in FIG. 20(*a*) was fit to a set of Zernike polynomials with 36 terms. The resulting profile was converted to a sag correction profile. Adding this correction profile to the second surface of the lens, a new set of OPD plots was obtained, as shown in FIGS. 20(*f*) (on-axis) and 20(*g*) (off-axis). With this correction profile, the lens has a peak-to-valley OPD of 0.013 (on-axis) and 0.158 (off-axis) waves, a significant reduction in wavefront error.

From the foregoing description, it will be apparent that there has been provided an improved lens for shaping a laser diode beam into a circular and collimated or diverging, or converging beam. Variations and modifications in the herein described lens, optical system and laser diode assembly in accordance with invention will undoubtedly suggest themselves to those skilled in the art. An arbitrary wavefront can be generated by properly specifying the Zernike polynomials for the corrector surface(s). Although the embodiments described herein, the desired output wavefront of the beam is either spherical or planar, it may be more desirable to have a non-spherical or non-planar wavefront for some application in the remainder of the optical system. This may include correcting aberrations in subsequent optical elements. For example, any arbitrary wavefront profile can be generated by including the appropriate surface modification in the specification of the corrector surface(s) in a lens provided in accordance with this invention. Accordingly, the foregoing description should be taken as illustrative and not in a limiting sense.

What is claimed is:

1. A lens for shaping a diverging beam produced by a laser diode comprising:

a body with two opposite ends and an optical axis along which said beam propagates; and said body having a first surface at one of said ends and a second surface at the other of said ends, said first and second surfaces having curvature profiles selected from the group which circularize and collimate, circularize and converge, or circularize and diverge said beam when said beam is incident said first surface, and said curvature profile of at least one of said first and second surfaces having a correction profile which reduces wavefront error in the beam exiting said lens.

2. The lens according to claim 1 wherein said first and second surfaces are toric.

3. The lens according to claim 1 wherein said correction profile is a function of Zernike polynomials.

4. The lens according to claim 1 wherein said correction profile produces correction of wavefront error in two dimensions transverse to said optical axis.

5. The lens according to claim 1 wherein said curvature profile is defined by the equation:

$$z(x, y) = \frac{y^2/R_y + x^2/R_x}{1 + \sqrt{1 - (1+k_y)y^2/R_y^2 - (1+k_x)x^2/R_x^2}} + Z(\rho, \phi)$$

where z(x,y) represents the curvature profile of at least one of said first and second surfaces at two-dimensional coordinates x and y along an x-axis and y-axis which are mutually perpendicular to each other and said optical axis, and y is the distance from the optical axis along the y-axis and x is the distance from the optical axis along the x-axis, $k_x$ and $k_y$ are conic constants along the x-axis and y-axis, respectively, $R_x$ and $R_y$ are the radius of curvature along the x-axis and y-axis of said at least one surface, respectively, and $Z(\rho,\phi)$ are Zernike polynomials, where $\rho$ is a normalized radial coordinate $(x^2+y^2)^{1/2}/r_{max}$ in which $r_{max}$ represents the maximum radial distance from the optical axis to an edge of said one surface, and $\phi$ is an angle between $\rho$ and the y-axis.

6. The lens according to claim 1 wherein one of said first surface and said second surface has said correction profile.

7. The lens according to claim 1 wherein both said first surface and said second surface have said correction profile and reduce wavefront error of the beam exiting said lens.

8. The lens according to claim 1 wherein said correction profile is a function of the misalignment of the laser diode from said optical axis, and which reduces said misalignment.

9. The lens according to claim 1 wherein said curvature profile of said first surface of said body refracts said beam to form an approximately circular beam in cross-section about said optical axis at said second surface, and said curvature profile of said second surface of said body refracts said beam to collimate or diverge or converge, said beam.

10. The lens according to claim 1 wherein said first and second surfaces are aspheric.

11. The lens according to claim 1 wherein said body of said lens is composed of a single lens element.

12. The lens according to claim 1 wherein said body of said lens is composed of a plurality of lens elements integrated into said body.

13. The lens according to claim 12 wherein said plurality of lens elements comprise a substrate having two opposite ends, a first optical element to provide said first surface, and a second optical element to provide said second surface, in which said first and second optical elements are attached to the opposite ends of said substrate, respectively, to provide said lens.

14. The lens according to claim 1 wherein said curvature profile of said first and second surfaces compensates for astigmatism.

15. The lens according to claim 1 wherein at least one of said first and second surfaces has a diffractive element thereon or associated therewith.

16. The lens according to claim 1 wherein the curvature profile of at least one of said first and second surfaces are selected from a group consisting of a single-point laser writer beam scanned over said one surface, optical lithography of said one surface, and electronic-beam lithography of said one surface.

17. A laser diode assembly comprising:
   a housing;
   a lens mounted in said housing having a body with two opposite ends and an optical axis;
   a laser mounted in said housing which produces a beam incident said lens and propagating along said optical axis; and
   said body having a first toric surface and a second toric surface at each of said ends, respectively, having different curvature profiles which circularize and collimate or diverge or converge said beam, and said curvature profile of at least one of said first and second surfaces has a correction profile which reduces wavefront error of the beam.

18. The assembly according to claim 17 wherein said correction profile is based on a correction of wavefront error by said lens in two dimensions transverse said optical axis.

19. The assembly according to claim 17 wherein said correction profile is a function of Zernike polynomials.

20. The assembly according to claim 17 wherein said body of said lens is composed of a single lens element.

21. The assembly according to claim 17 wherein said body of said lens is composed of a plurality of lens elements integrated into said body.

22. A method for shaping a diverging beam produced by a laser diode comprising the steps of:
   providing a lens having a body with a first surface at one end of said body and a second surface at the other end of said body, and an optical axis;
   passing said beam from said laser diode through said body along said optical axis;
   refracting said beam at said first and second surfaces of said body to circularize and collimate or converge or diverge said beam; and
   providing a correction profile at at least one of said first and second surfaces to reduce wavefront error of the beam exiting said lens.

23. The method according to claim 22 wherein said correction profile is a function of Zernike polynomials.

24. The method according to claim 22 wherein said correction profile is based on a correction of wavefront error by said lens in two dimensions transverse said optical axis.

25. The method according to claim 22 wherein said first and second surfaces are toric.

26. The method according to claim 22 wherein at least one of said first surface and said second surface has said correction profile.

27. A lens for shaping a diverging beam along the optical axis of said lens comprising a body having two opposing toric surfaces, respectively, with curvature profiles which circularize and collimate or diverge or converge said beam when incident said body, and said curvature profile of at least one of said surfaces has a correction profile which provides high-order correction of said beam in accordance with Zernike polynomials.

28. An optical system for shaping a diverging beam produced by a laser diode comprising:
   a lens having a body with two opposite ends and an optical axis; and
   said body having a first surface at one of said ends and a second surface at the other of said ends in which said first and second surfaces have curvature profiles which circularize and collimate or diverge or converge said beam, and said curvature profile of at least one of said first and second surfaces has a correction profile which reduces wavefront error in the beam exiting said lens.

29. The optical system according to claim 28 further comprising a laser diode for producing said beam.

30. A lens for shaping a diverging beam produced by a laser diode comprising:
   a body with two opposite ends and an optical axis along which said beam propagates; and
   said body having a first surface at one of said ends and a second surface at the other of said ends, said first and second surfaces having curvature profiles which circularize and collimate said beam when said beam is incident said first surface, and said curvature profile of at least one of said first and second surfaces having a correction profile which reduces wavefront error in the beam exiting said lens.

31. The lens according to claim 30 wherein said first and second surfaces are toric.

32. The lens according to claim 30 wherein said correction profile is a function of Zernike polynomials.

33. The lens according to claim 30 wherein said correction profile produces correction of wavefront error in two dimensions transverse to said optical axis.

34. The lens according to claim 30 wherein said curvature profile is defined by the equation:

$$z(x, y) = \frac{y^2/R_y + x^2/R_x}{1 + \sqrt{1 - (1+k_y)y^2/R_y - (1+k_x)x^2/R_x}} + Z(\rho, \phi)$$

where $z(x,y)$ represents the curvature profile of at least one of said first and second surfaces at two-dimensional coordinates x and y along a x-axis and y-axis which are mutually perpendicular to each other and said optical axis, and y is the distance from the optical axis along the y-axis and x is the distance from the optical axis along the x-axis, $k_x$ and $k_y$ are conic constants along the x-axis and y-axis, respectively, $R_x$ and $R_y$ are the radius of curvature along the x-axis and y-axis of said at least one surface, respectively, and $Z(\rho,\phi)$ are Zernike polynomials, where $\rho$ is a normalized radial coordinate $(x^2+y^2)^{1/2}/r_{max}$ in which $r_{max}$ represents the maximum radial distance from the optimal axis to an edge of said one surface, and $\phi$ is an angle between $\rho$ and the y-axis.

35. The lens according to claim 30 wherein one of said first surface and said second surface has said correction profile.

36. The lens according to claim 30 wherein both said first surface and said second surface have said correction profile and reduce wavefront error of the beam exiting said lens.

37. The lens according to claim 30 wherein said correction profile is a function of the misalignment of the laser diode from said optical axis, and which reduces said misalignment.

38. The lens according to claim 30 wherein said curvature profile of said first surface of said body refracts said beam to form an approximately circular beam in cross-section about said optical axis at said second surface, and said curvature profile of said second surface of said body refracts said beam to approximately collimate said beam.

39. The lens according to claim 30 wherein said first and second surfaces are aspheric.

40. The lens according to claim 30 wherein said body of said lens is composed of a single lens element.

41. The lens according to claim 30 wherein said body of said lens is composed of a plurality of lens elements integrated into said body.

42. The lens according to claim 41 wherein said plurality of lens elements comprise a substrate having two opposite ends, a first optical element to provide said first surface, and a second optical element to provide said second surface, in which said first and second optical elements are attached to the opposite ends of said substrate, respectively, to provide said lens.

43. The lens according to claim 30 wherein said curvature profile of said first and second surfaces compensates for astigmatism.

44. The lens according to claim 30 wherein at least one of said first and second surfaces has a diffractive element thereon or associated therewith.

45. The lens according to claim 30 wherein the curvature profile of at least one of said first and second surfaces are selected from a group consisting of a single-point laser writer beam scanned over said one surface, optical lithography of said one surface, and electronic-beam lithography of said one surface.

46. A laser diode assembly comprising:

a housing;

a lens mounted in said housing having a body with two opposite ends and an optical axis;

a laser mounted in said housing which produces a beam incident said lens and propagating along said optical axis; and said body having a first toric surface and a second toric surface at each of said ends, respectively, having different curvature profiles which circularize and collimate said beam, and said curvature profile of at least one of said first and second surfaces has a correction profile which reduces wavefront error of the beam.

47. The assembly according to claim 46 wherein said correction profile is based on a correction of wavefront error by said lens in two dimensions transverse said optical axis.

48. The assembly according to claim 46 wherein said correction profile is a function of Zernike polynomials.

49. The assembly according to claim 46 wherein said body of said lens is composed of a single lens element.

50. The assembly according to claim 46 wherein said body of said lens is composed of a plurality of lens elements integrated into said body.

51. A method for shaping a diverging beam produced by a laser diode comprising the steps of:

providing a lens having a body with a first surface at one end of said body and a second surface at the other end of said body, and an optical axis;

passing said beam from said laser diode through said body along said optical axis;

refracting said beam at said first and second surfaces of said body to circularize and collimate said beam; and providing a correction profile at at least one of said first and second surfaces to reduce wavefront error of the beam exiting said lens.

52. The method according to claim 51 wherein said correction profile is a function of Zernike polynomials.

53. The method according to claim 51 wherein said correction profile is based on a correction of wavefront error by said lens in two dimensions transverse said optical axis.

54. The method according to claim 51 wherein said first and second surfaces are toric.

55. The method according to claim 51 wherein at least one of said first surface and said second surface has said correction profile.

56. A lens for shaping a diverging beam along the optical axis of said lens comprising a body having a two opposing toric surfaces, respectively, with curvature profiles which circularize and collimate said beam when incident said body, and said curvature profile of at least one of said surfaces has a correction profile which provides high-order correction of said beam in accordance with Zernike polynomials.

57. An optical system for shaping a diverging beam produced by a laser diode comprising:

a lens having a body with two opposite ends and an optical axis; and said body having a first surface at one of said ends and a second surface at the other of said ends in which said first and second surfaces have curvature profiles which circularize and collimate said beam, and said curvature profile of at least one of said first and second surfaces has a correction profile which reduces wavefront error in the beam exiting said lens.

58. The optical system according to claim 57 further comprising a laser diode for providing said beam.

* * * * *